(12) United States Patent
Wong et al.

(10) Patent No.: US 9,111,562 B2
(45) Date of Patent: Aug. 18, 2015

(54) RECORDING MEDIUM AND A METHOD OF WRITING SERVO INFORMATION ON THE SAME

(71) Applicant: MARVELL INTERNATIONAL LTD., Hamilton (BM)

(72) Inventors: Chiew Leong Wong, Singapore (SG); Pantelis Alexopoulos, Singapore (SG); Zhimin Yuan, Singapore (SG); Chun Lian Ong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/378,778

(22) PCT Filed: Feb. 18, 2013

(86) PCT No.: PCT/SG2013/000065
§ 371 (c)(1),
(2) Date: Aug. 14, 2014

(87) PCT Pub. No.: WO2013/122550
PCT Pub. Date: Aug. 22, 2013

(65) Prior Publication Data
US 2015/0009589 A1    Jan. 8, 2015

(30) Foreign Application Priority Data
Feb. 17, 2012    (SG) .............................. 201201136-7

(51) Int. Cl.
*G11B 5/09*    (2006.01)
*G11B 5/596*   (2006.01)
(Continued)

(52) U.S. Cl.
CPC ............ *G11B 5/59655* (2013.01); *G11B 5/012* (2013.01); *G11B 5/5965* (2013.01); *G11B 5/59638* (2013.01); *G11B 5/66* (2013.01); *G11B 5/82* (2013.01)

(58) Field of Classification Search
CPC .......... G11B 27/3027; G11B 2220/90; G11B 5/012; G11B 5/59655; G11B 5/59688; G11B 5/59633
USPC ......... 360/48, 49, 133, 135, 77.08, 29, 77.12; 369/275.2, 275.3, 44.26, 53.22
See application file for complete search history.

(56) References Cited

U.S. PATENT DOCUMENTS

| 4,783,705 A | 11/1988 | Moon et al. |
| 5,255,136 A | 10/1993 | Machado et al. |

(Continued)

FOREIGN PATENT DOCUMENTS

| EP | 0829853 A2 | 3/1998 |
| EP | 1256940 A2 | 11/2002 |

(Continued)

OTHER PUBLICATIONS

International Preliminary Report on Patentability for International Application No. PCT/SG2013/000065 dated Aug. 19, 2014, pp. 1-7.

(Continued)

*Primary Examiner* — Nabil Hindi

(57) ABSTRACT

In various embodiments, a method of writing servo information to a recording medium may be provided. The method include forming a first servo pattern (including a servo burst pattern) on a segment of a first track of a first layer of the recording medium, the first track having a track width. The method may further include forming a second servo pattern (including addressing information) on a segment of a second track of a second layer of the recording medium. The second track is arranged from the first track by half the track width.

20 Claims, 18 Drawing Sheets

(51) Int. Cl.
*G11B 5/012* (2006.01)
*G11B 5/66* (2006.01)
*G11B 5/82* (2006.01)

(56) References Cited

U.S. PATENT DOCUMENTS

| | | |
|---|---|---|
| 5,402,278 A | 3/1995 | Morita |
| 5,544,135 A | 8/1996 | Akin, Jr. et al. |
| 5,739,972 A | 4/1998 | Smith et al. |
| 5,923,492 A | 7/1999 | Liikanen |
| 6,243,223 B1 | 6/2001 | Elliott et al. |
| 6,433,950 B1 | 8/2002 | Liikanen |
| 6,909,563 B2 | 6/2005 | Nishikawa et al. |
| 7,149,042 B2 | 12/2006 | Nishikawa et al. |
| 7,522,362 B2 * | 4/2009 | Komine et al. ............ 360/48 |
| 2003/0053261 A1 | 3/2003 | Thia et al. |
| 2003/0063403 A1 | 4/2003 | Nishikawa et al. |
| 2004/0252394 A1 | 12/2004 | Hamaguchi et al. |

FOREIGN PATENT DOCUMENTS

| | | |
|---|---|---|
| JP | 2003173516 A | 6/2003 |
| JP | 2005004917 A | 1/2005 |
| JP | 5074076 B2 | 11/2012 |

OTHER PUBLICATIONS

International Search Report and Written Opinion for International Application No. PCT/SG2013/000065 dated Mar. 25, 2013, pp. 1-9.

* cited by examiner

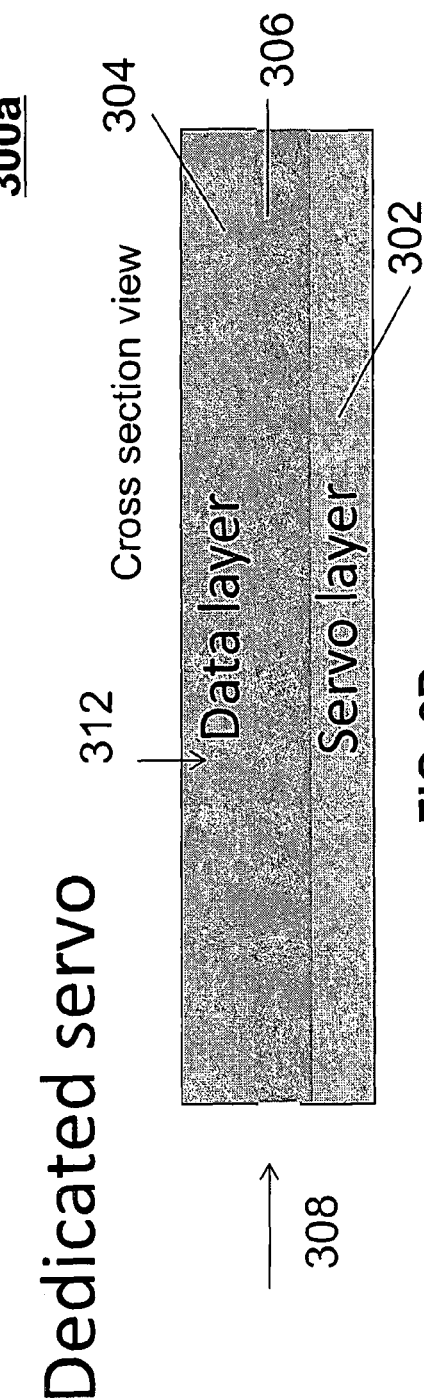
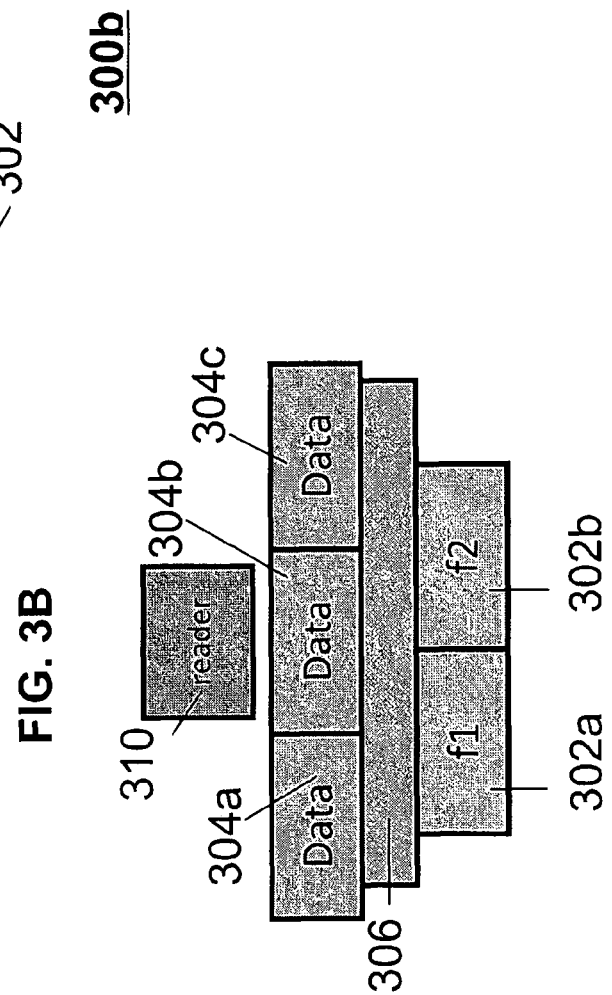
FIG. 3A
FIG. 3B

FIG. 4

400 forming a first servo pattern including a servo burst pattern on a segment of a first track of a first layer of the recording medium, the first track having a track width

402 forming a second servo pattern including addressing information on a segment of a second track of a second layer of the recording medium; wherein the second track is arranged from the first track by half the track width

404

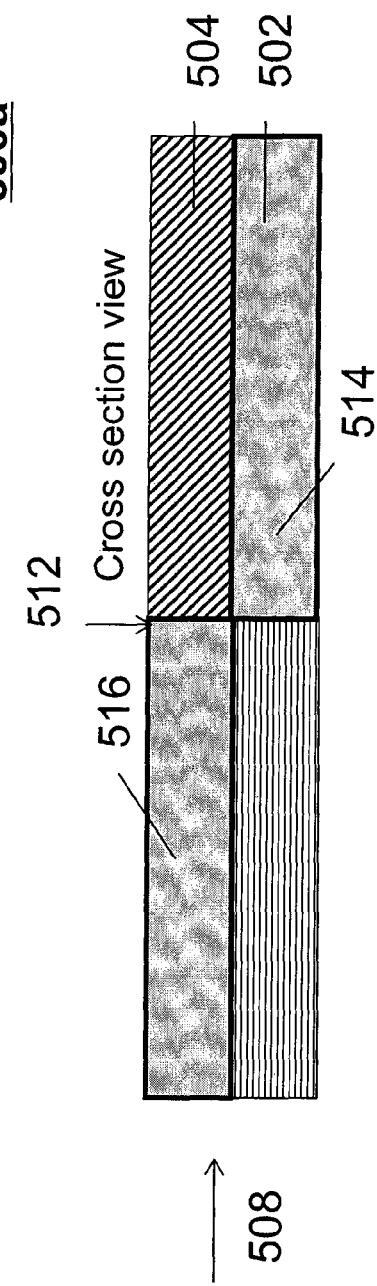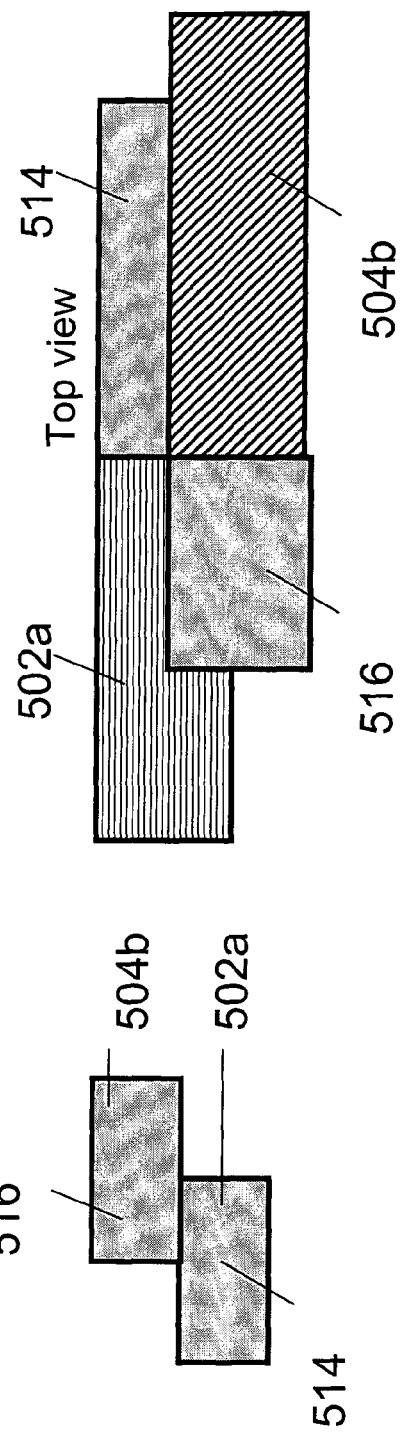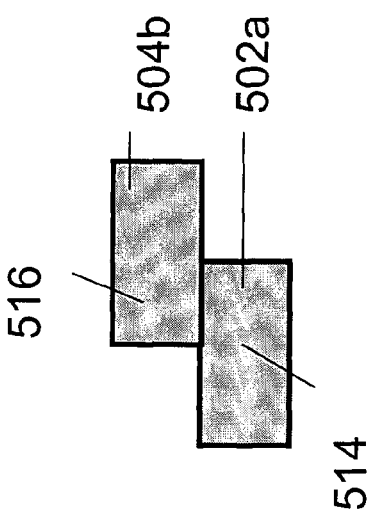

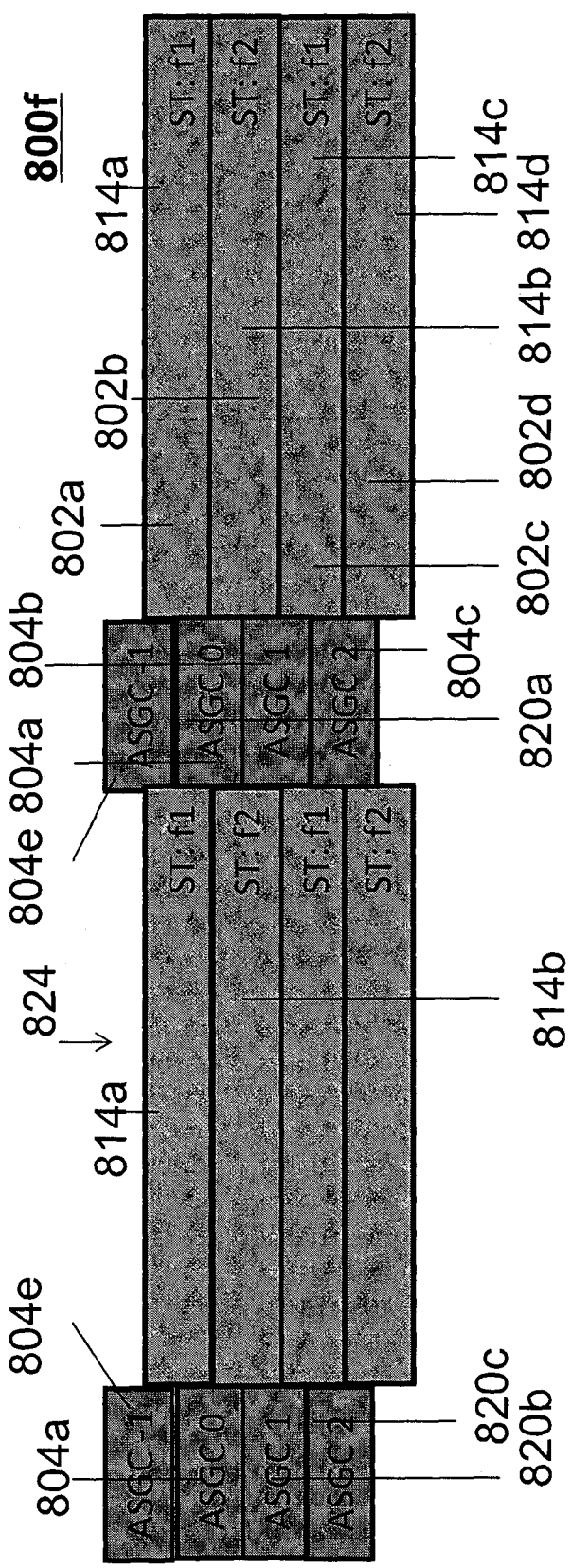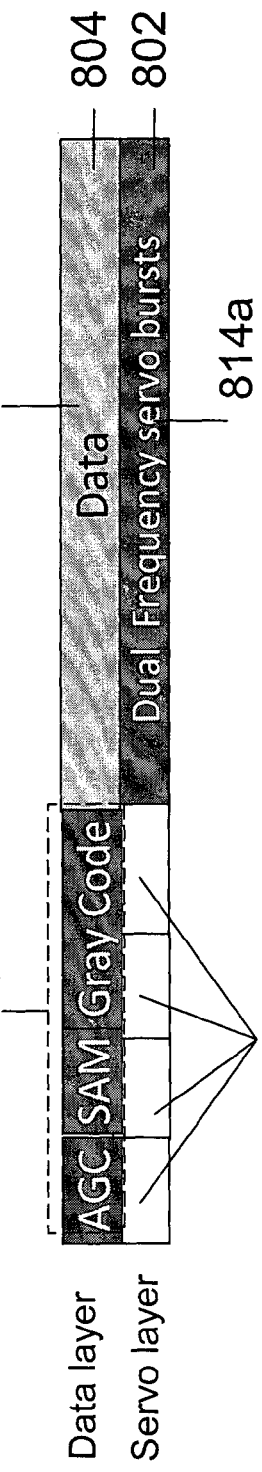

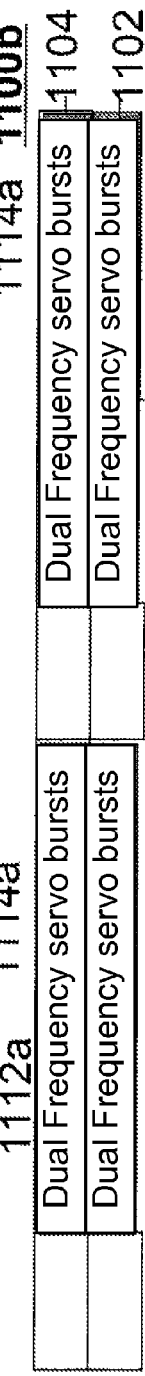
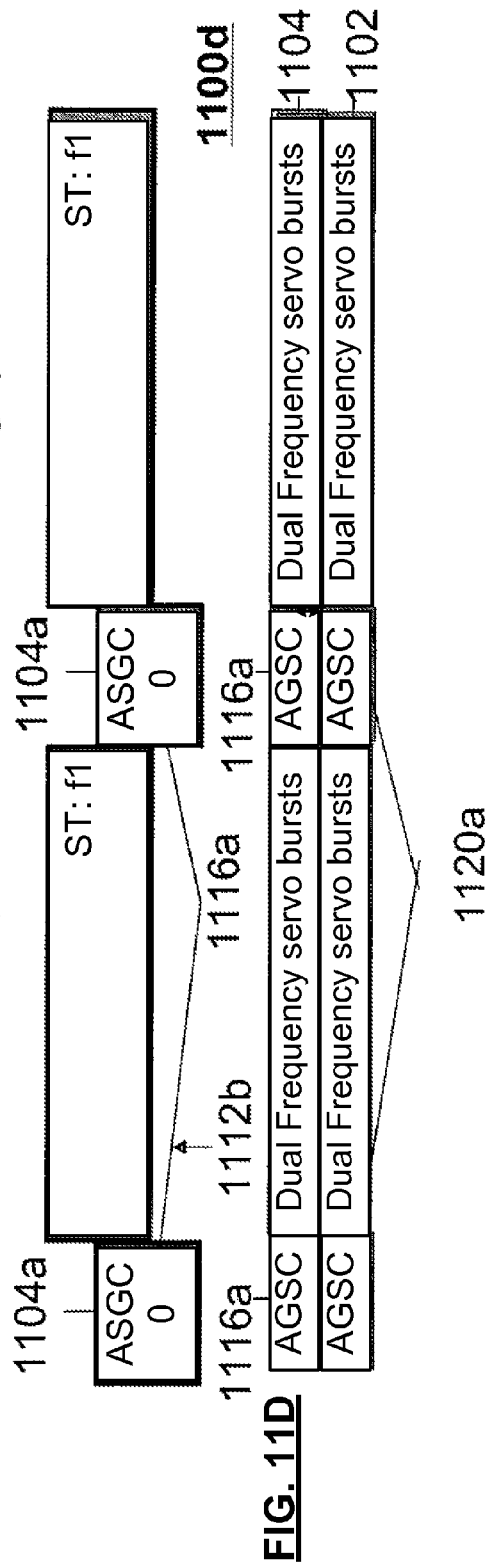
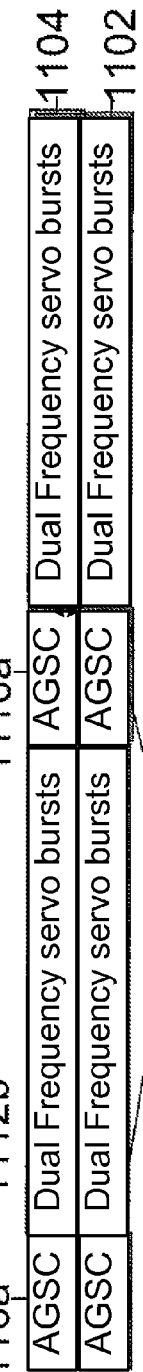

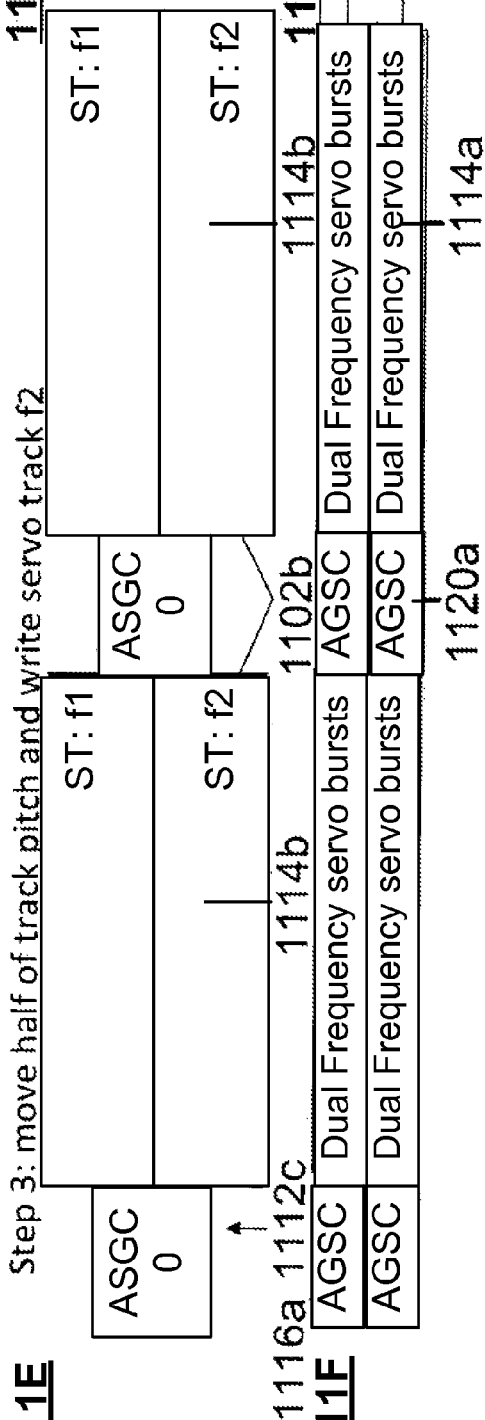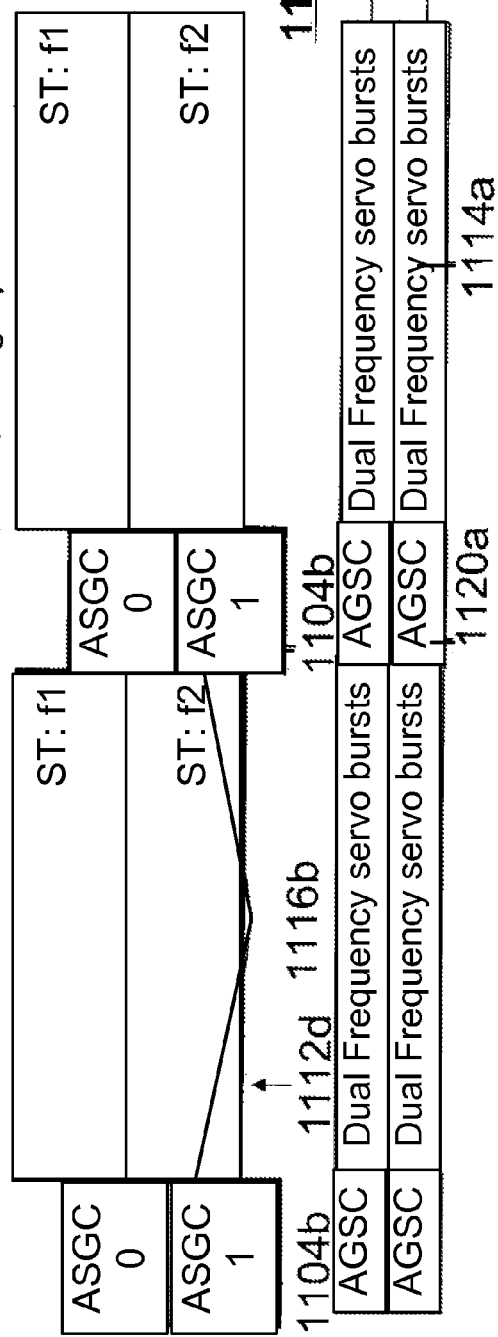

RECORDING MEDIUM AND A METHOD OF WRITING SERVO INFORMATION ON THE SAME

CROSS-REFERENCE TO RELATED APPLICATION

This application claims the benefit of priority of Singapore patent application No. 201201136-7, filed 17 Feb. 2012, the content of it being hereby incorporated by reference in its entirety for all purposes.

TECHNICAL FIELD

Various aspects of this disclosure relate to recording media and methods of writing servo information on the same.

BACKGROUND

In conventional hard disks having a rotating magnetic medium, there is only one magnetic layer to record data. As such, the servo pattern information is recorded in servo wedges. This way of storing servo information is also known as embedded servo. FIG. 1 is a schematic 100 showing the arrangement of servo pattern information 102 along a track on the magnetic layer. Servo information 102 is interspersed with data information 104.

The position of the read/write head is demodulated from the servo wedges. Thus, the sampling frequency of the servo control system is thus limited by the number of servo wedges in one revolution, and the rotating speed of disk. To improve the servo performance, such as tracking accuracy for high track density drive, a higher sampling rate is needed, which in turn requires more servo wedges to be placed in the magnetic layer. However, this will cause less data sector to be available for recording the user data. This is undesirable.

SUMMARY

In various embodiments, a method of writing servo information to a recording medium may be provided. The method include forming a first servo pattern (including a servo burst pattern) on a segment of a first track of a first layer of the recording medium, the first track having a track width. The method may further include forming a second servo pattern (including addressing information) on a segment of a second track of a second layer of the recording medium. The second track is arranged from the first track by half the track width.

In various embodiments, a recording medium may be provided. The recording medium may include a first servo pattern including a servo burst pattern on a segment of a first track of a first layer of the recording medium. The method may further include a second servo pattern including addressing information on a segment of a second track of a second layer of the recording medium. The second track may be arranged from the first track by half the track width.

BRIEF DESCRIPTION OF THE DRAWINGS

The invention will be better understood with reference to the detailed description when considered in conjunction with the non-limiting examples and the accompanying drawings, in which:

FIG. 3A shows the cross sectional side view of a portion of a data recording medium along a plane parallel to the circumference of the data recording medium according to various embodiments; FIG. 3B shows the cross-sectional side view across three data tracks and two servo tracks according to various embodiments.

FIG. 4 shows a method of writing servo information according to various embodiments on a recording medium.

FIG. 5A shows a cross sectional side view of a data recording medium along a plane parallel to the circumference of the data recording medium with servo information stored according to various embodiments; FIG. 5B shows the cross-sectional side view across a data track and a servo track with servo information stored according to various embodiments; and FIG. 5C shows the top view of a data track and a servo track with servo information stored according to various embodiments.

FIG. 8, which include 8A to G, shows a method to arrange the servo information shown in FIG. 7 according to various embodiments; wherein FIG. 8A shows a top view of servo tracks in a first layer after a writing pass according to various embodiments; wherein FIG. 8B shows the side view of a portion along a servo track in the first layer and the overlying second layer after a writing pass according to various embodiments; wherein FIG. 8C shows the cross section of the first track on the first layer as well as overlying tracks and on the second layer; wherein FIG. 8D shows a wide head according to various embodiments; wherein FIG. 8E shows a wide head in operation according to various embodiments; wherein FIG. 8F shows a top view of servo tracks a first layer as well as portions of data tracks in a second layer after a subsequent writing pass according to various embodiments; and wherein FIG. 8G shows the side view of a portion along a servo track in the first layer and the overlying second layer after a subsequent writing pass according to various embodiments.

FIG. 11, which includes FIGS. 11A to H, shows a method to arrange the servo information shown in FIG. 10 according to various embodiments; wherein FIG. 11A shows a top view of portions of a plurality of tracks configured to store servo information after a first step; wherein FIG. 11B shows a side view of FIG. 11A; wherein FIG. 11C shows a top view of portions of a plurality of tracks configured to store servo information after a second step; wherein FIG. 11D shows a side view of FIG. 11C; wherein FIG. 11E shows a top view of portions of a plurality of tracks configured to store servo information after a third step; wherein FIG. 11F shows a side view of FIG. 11E; wherein FIG. 11G shows a top view of portions of a plurality of tracks configured to store servo information after a fourth step; and wherein FIG. 11H shows a side view of FIG. 11G.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The product can be a consumer electronic device which can be operable in various orientations, and thus it should be understood that the terms "top", "bottom", "base", "down", "sideways", "downwards" etc., when used in the following description are used for convenience and to aid understanding of relative positions or directions, and not intended to limit the orientation of the recording medium or the product incorporating the recording medium.

Various aspects may provide a recording medium and a method of writing servo information on the same that is able to address at least partially the abovementioned challenges.

Figure 1:
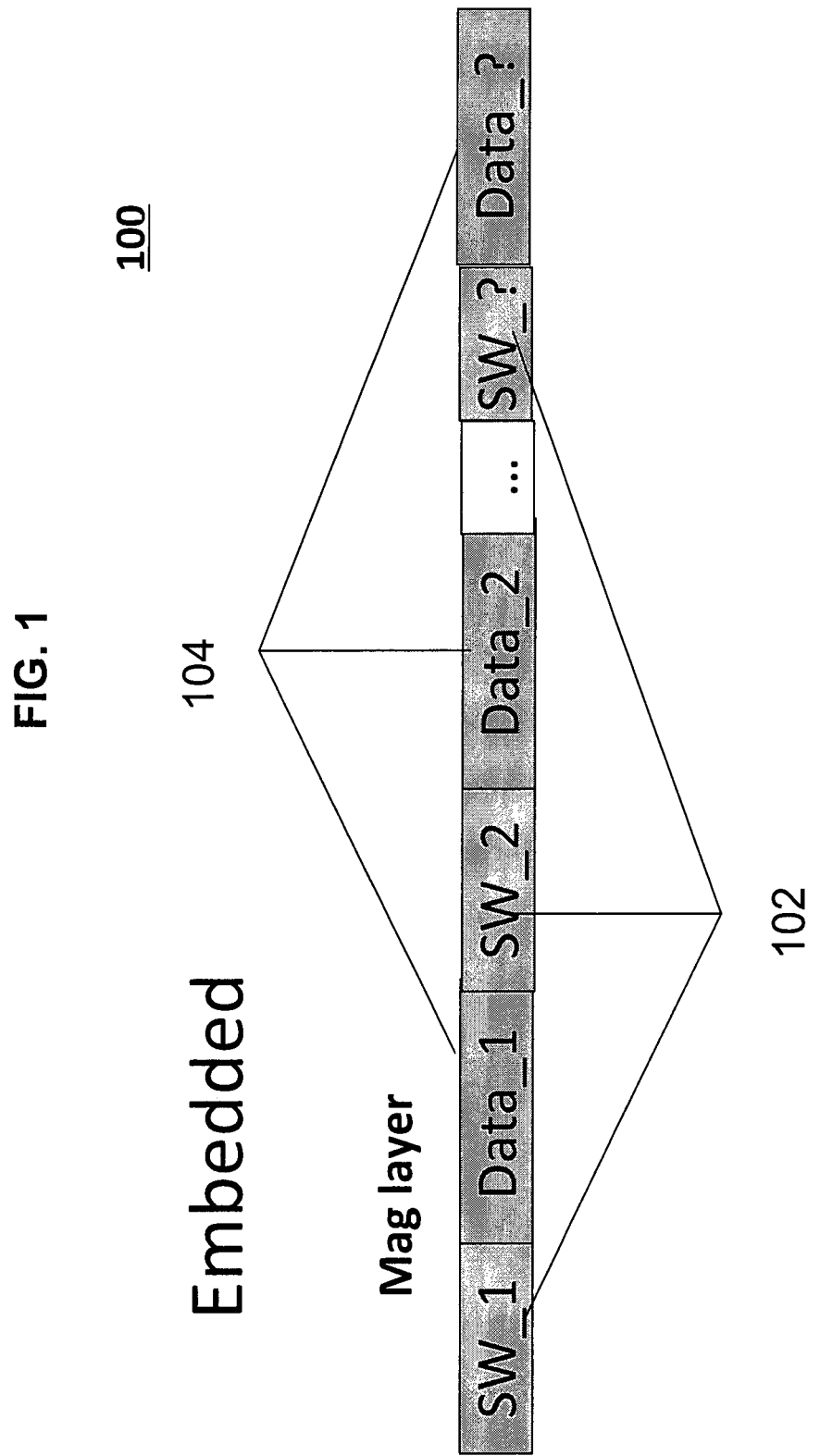
FIG. 1 shows the arrangement of servo pattern information along a track on the magnetic layer.
Figure 2:
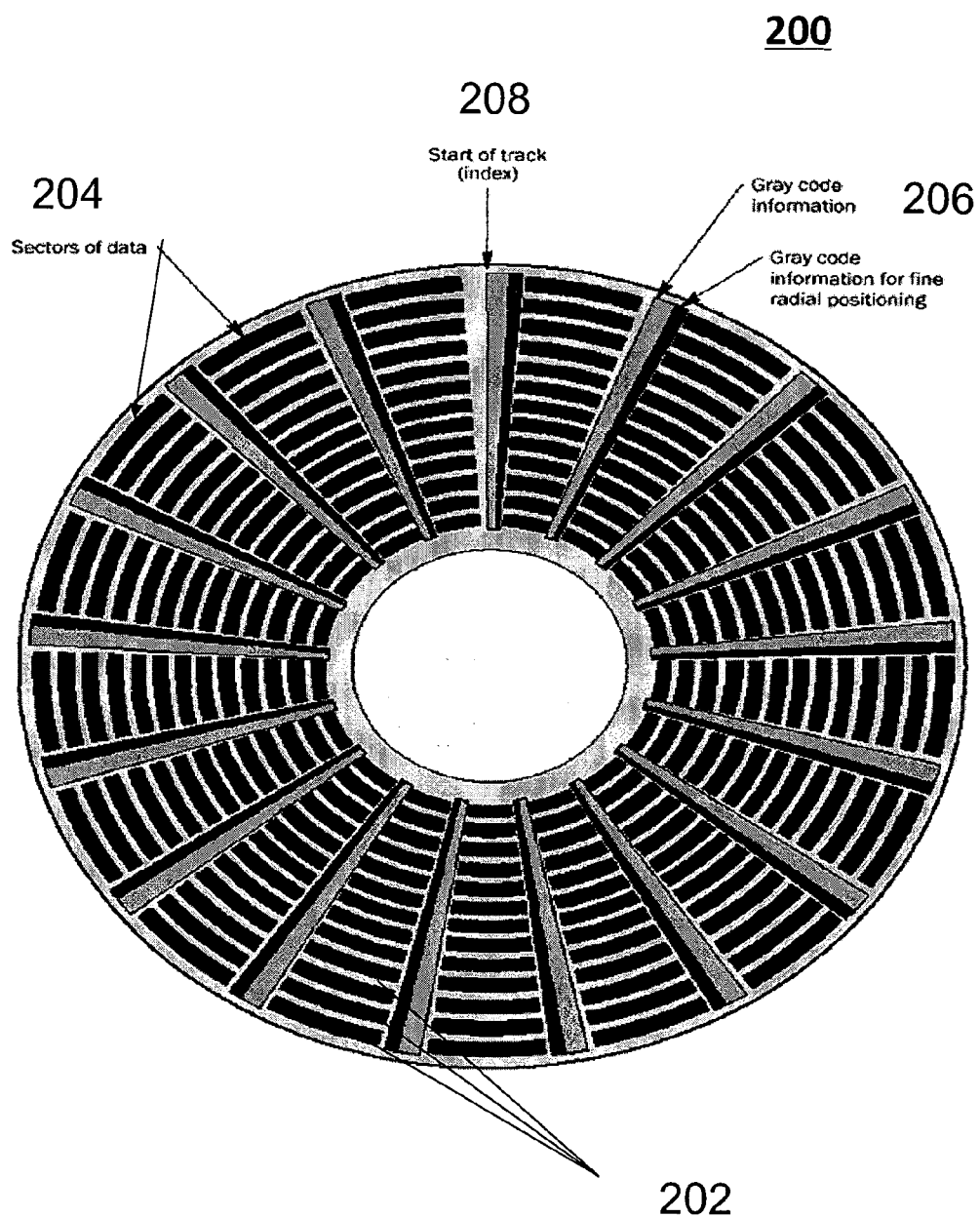
FIG. 2 shows a top planar view of a recording medium.

FIG. 2 is a schematic 200 showing a top planar view of a recording medium. The recording medium may have tracks 202 running in parallel to the circumference of the recording medium. The recording medium may also be divided into data sectors 204 with addressing information (eg. GrayCode 206 and other addressing information 208) interspersed between the data sectors.

In various embodiments, the recording medium may be in the shape of a disk. The disc may have a first main surface and a second main surface substantially parallel to the first main surface. The disc may also have a lateral side joining the first main surface and the second main surface. The lateral side may be substantially perpendicular to the first main surface and the second main surface.

The medium may be a magnetic medium. The first layer or servo layer may be a magnetic layer or more, specifically a ferromagnetic layer. The second layer or data recording layer (alternatively called the data layer) may be a magnetic layer or more specifically a ferromagnetic layer. The first magnetic layer and the second magnetic layer may form a single monolithic structure. Further, the first magnetic layer and the second magnetic layer may be put on the same side of a disk platter and they may be read and/or processed together.

In other words, a magnetic medium including two layers may be provided to store information. One of the layer is stacked on top of the other layer. The second layer (which may alternatively be called the data recording layer) may be configured to store user data. References to "data" usually refer to "user data", unless it is otherwise clear from the context. A portion of the servo information is stored in the first layer (which may alternatively be called the servo layer).

FIG. 3A is a schematic 300a showing the cross sectional side view of a portion of a data recording medium along a plane parallel to the circumference of the data recording medium according to various embodiments. In various embodiments, the recording medium may include two layers, i.e. a first layer 302 and a second layer 304. One layer may be stacked over another layer to form the disk (i.e. the two layers form a stacked arrangement). In various embodiments, the second layer 304 may be arranged over the first layer 302. In various embodiments, the first layer 302 may be configured to record at least a portion of servo pattern information and is called the servo layer. In various embodiments, the second layer 304 may be configured to record data and is called the data recording layer (or data layer). The second layer 304 may be further configured to record addressing information of servo pattern information. The first layer 302 may be separated from the second layer 304 by one or more intermediate layers 306. Alternatively, the second layer 304 may be on the first layer 302.

The recording medium may have a plurality of tracks. The plurality of tracks (for instance, a first track and a second track) may run parallel to the circumference of the recording medium. As such, the first track may be parallel to the second track. The plurality of tracks may form a plurality of concentric rings on the recording medium. The plurality of concentric rings have a common centre coinciding with an axis of the disk running from the center of the first main surface of the disk to the second main surface of the disk. In operation, the recording medium may be rotated about the axis of the disk. Each track may include a plurality of segments along the length of the track.

FIG. 3B is a schematic 300b showing the cross-sectional side view across three data tracks 304a, 304b, 3404c and two servo tracks 302a, 302b according to various embodiments. FIG. 3B may correspond to the view in a direction indicated by arrow 308 in FIG. 3A. The data tracks 304a, 304b, 304c may be configured to record data. The data tracks 304a, 304b, 304c may be further configured to record addressing information of servo pattern information. The second layer or data layer 304 may include the data tracks 304a, 304b, 304c. The servo tracks 302a, 302b may be configured to record at least a portion of servo information. For instance, the servo tracks 302a, 302b may be configured to record servo bursts. The first layer or servo layer 302 may include the servo tracks 302a, 302b. A reader head 310 may be positioned over the tracks.

Figure 3C:
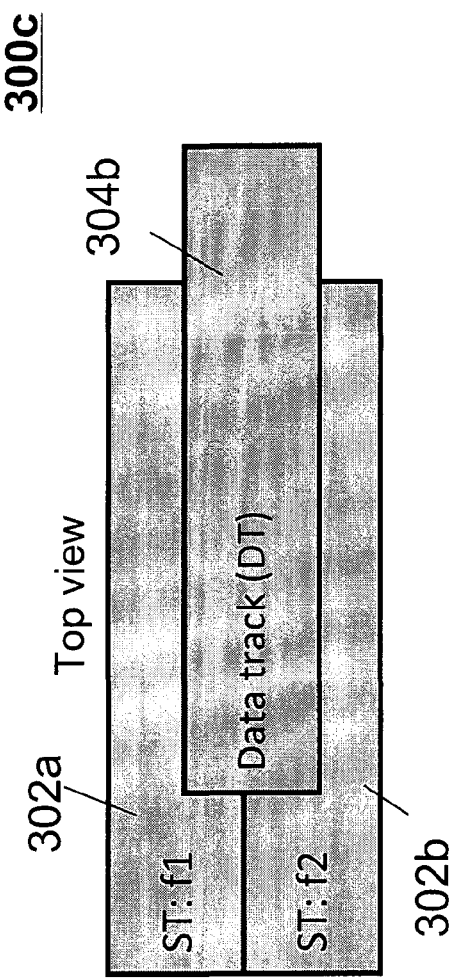
FIG. 3C shows the top view of a data track and two servo tracks according to various embodiments.

FIG. 3C is a schematic 300c showing the top view of a data track 304b and two servo tracks 302a, 302b according to various embodiments. FIG. 3C may correspond to the view indicated by arrow 312 in FIG. 3A.

In various embodiments, servo information may include a first servo pattern. The first servo pattern may include a servo burst pattern. Servo information may also include a second servo pattern. The second servo pattern may include addressing information. In various embodiments, the first servo pattern may be stored in the first layer or servo layer 302. The second servo pattern (including addressing information) may be stored in the second layer or data recording layer 304. Additionally, data may be stored in the second layer or data layer 304. In various embodiments, storing the first servo pattern in the servo layer 302 may free up space in the data recording layer 304 and may improve surface utilization rate for the data recording layer 304.

Figure 3D:
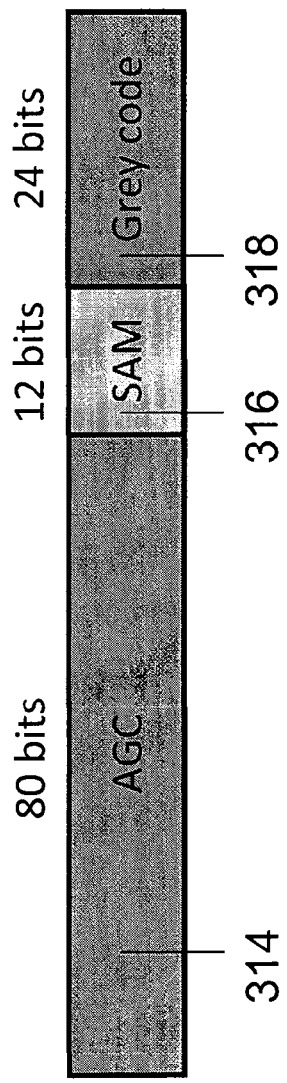
FIG. 3D shows types of address information according to various embodiments.

FIG. 3D is a schematic 300d showing the types of address information according to various embodiments. Addressing information may include automatic gain control (AGC) 314. Additionally, addressing information may include sector address mark (SAM) 316. Addressing information may also include GrayCode 318. AGC 314 may occupy 80 bits, while SAM 316 may occupy 12 bits and GrayCode 318 may occupy 24 bits.

FIG. 4 is a schematic 400 that shows a method of writing servo information according to various embodiments on a recording medium. The method may provide, in 402, forming a first servo pattern (including a servo burst pattern) on a segment of a first track of a first layer of the recording medium, the first track having a track width. The method may further provide, in 404, forming a second servo pattern (including addressing information) on a segment of a second track of a second layer of the recording medium. The second track may be arranged from the first track by half the track width.

In various embodiments, the first track may be servo track 302a as shown in FIGS. 3B and 3C. the second track may be data track 304b as shown in FIGS. 3B and 3C. The first track may have a track width. The second track may also have a track width, which may be substantially equal to the track width of the first track. In fact, in various embodiments, the track width of each track in the recording medium, including each servo track and each data track, may be substantially equal to one another.

The second track 304b may be arranged from the first track 302a by half a track width. In other words, the second track 304b may be arranged from the first track 302a such that the projection of the second track 304b on a plane parallel to the first main surface of the recording medium (or the second main surface of the recording medium) is half a track width from the projection of the first track 302a on the plane.

FIG. 5A is a schematic 500a showing a cross sectional side view of a data recording medium along a plane parallel to the circumference of the data recording medium with servo information stored according to various embodiments. The recording medium may include a first layer 502 and a second layer 504 on the first layer 502. FIG. 5B is a schematic 500b showing the cross-sectional side view across a data track 504b and a servo track 502a with servo information stored according to various embodiments. FIG. 5B may correspond to the view in a direction indicated by arrow 508 in FIG. 5A. FIG. 5C is a schematic 500c showing the top view of a data track 504b and a servo track 502a with servo information stored according to various embodiments. FIG. 5C may correspond to the view indicated by arrow 512 in FIG. 5A.

In various embodiments, a recording medium may be provided. The recording medium may include a first servo pattern 514 (including a servo burst pattern) on a segment of a first track 502a of a first layer 502 of the recording medium. The recording medium may also include a second servo pattern 516 (including addressing information) on a segment of a second track 504b of a second layer 504 of the recording medium. The second track 504b may be arranged from the first track 502a by half the track width.

In other words, servo information may be arranged on the recording medium such that a first portion of the servo information (i.e. the first servo pattern 514 including a servo burst pattern) is on a first layer 502. A second portion of the servo information (i.e. a second servo pattern 516 including addressing information) is on a second layer 504. The first servo pattern 514 may be stored on a segment of the first track 502a located in the first layer 502 of the recording medium. The second servo pattern 516 may be stored on a segment of the second track 504b located in the second layer 504 of the recording medium. The projection of the first track 502a on a plane parallel to the first main surface (or second main surface) of the recording medium may be half a trackwidth from the projection of the second track 504b on the plane.

In order to demodulate the addressing information in real time, the addressing information may be required to be of a good quality. As the second layer (data recording layer) is positioned closer to a reader (or read head) during reading, it may be desirable for addressing information to be stored in the second layer (data recording layer). The addressing information may include automatic gain control (AGC). Additionally, addressing information may include sector address mark (SAM). Addressing information may also include GrayCode.

According to various embodiments, the automatic gain control (AGC) may also be used to establish a feedback clock signal for synchronization of media read and write operations to minimize the effect of spindle speed fluctuation. The AGC may also be used to normalize the amplitude of read-back signal for gray code detector and SAM detector. The SAM may provide the down-track information which tells the number of servo sectors that read head has crossed. The GrayCode may indicate the servo track number (track address) that read head is following. All servo sectors on a servo track have the same servo track number encoded.

The number of track address markings may be reduced to 100 while still maintaining performance of the track seeking process. While the addressing information such as the Gray-Code is stored in the second layer (data recording layer), the total area of the data area for storing servo information may still less than 2%. As such, by storing the servo bursts in the first layer (servo layer) and storing the addressing information in the second layer (first layer), large amount of area may be devoted for storing data without reducing performance.

Figure 6:
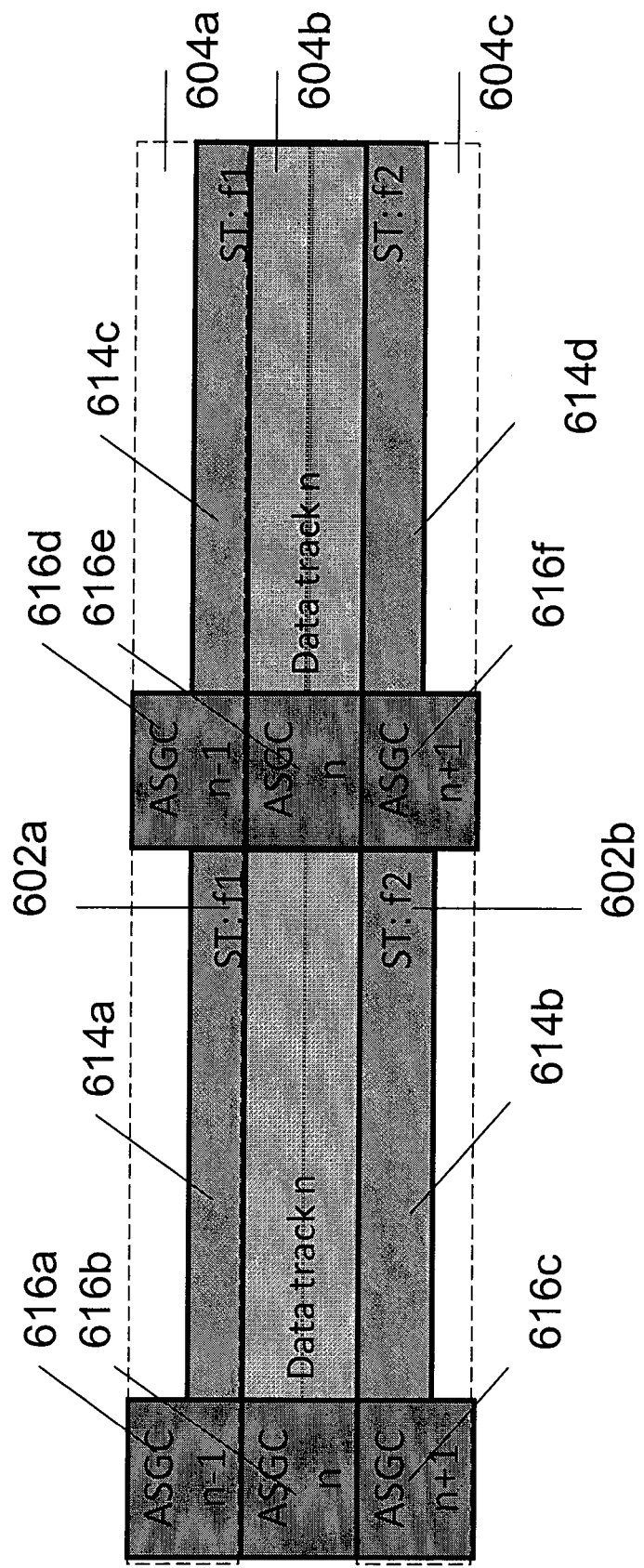
FIG. 6 shows the top view of portions of data tracks and two servo tracks with servo information stored according to various embodiments.

FIG. 6 is a schematic 600 showing the top view of a data track 604b, portions of data tracks 604a, 604c and two servo tracks 602a, 602b with servo information stored according to various embodiments. Only portions of the data tracks 604a, 604c having servo information 616a, 616c, 616d, 616f are shown. The remaining portions of the data tracks 604a, 604c are indicated by dashed lines. The second layer (including data tracks 604a, 604b, 604c) may be arranged over the first layer (including servo tracks 602a, 602b).

The recording medium may include a first servo pattern 614a, 614c (including a servo burst pattern) on a segment of a first track 602a of a first layer of the recording medium. The recording medium may also include a second servo pattern 616b, 616e (including addressing information) on a segment of a second track 604b of a second layer of the recording medium. The recording medium may further include a third servo pattern 614b, 614d including a subsequent servo burst pattern on a segment of a third track 602b of the first layer of the recording medium. The third track 602b may be arranged from the second track 604b by half a track width.

The second track 604b may be between the first track 602a and the third track 602b. "Between" may mean that the projection of the center line of the second track 604b on a plane parallel to the first main surface (or second main surface) of the recording medium is between the projection of the center line of the first track 602a on the plane and the projection of the center line of the third track 602b on the plane. The center line of a track runs along the track.

In various embodiments, the servo burst pattern may be of a first frequency (f1) and the subsequent servo burst pattern may be of a second frequency (f2). The servo burst patterns provide dual frequency signals to a read head. A positioning error signal (PES) may generated by finding the difference in signal amplitude between f1 and f2. When a read head is positioned over the edge between the first track 602a and the third track 602b (i.e. over the entire width of the second track 604b), PES may be at a minimum. The read head may ideally be positioned over the edge during reading for good track following.

In various embodiments, the servo burst pattern may be of a single frequency or of multi-frequencies. For instance, the servo burst pattern may also be of triple frequencies. In various embodiments, the servo burst pattern and the subsequent servo burst pattern may be of one frequency. The servo burst pattern and the subsequent servo burst pattern may be direct current (DC).

Figure 7:
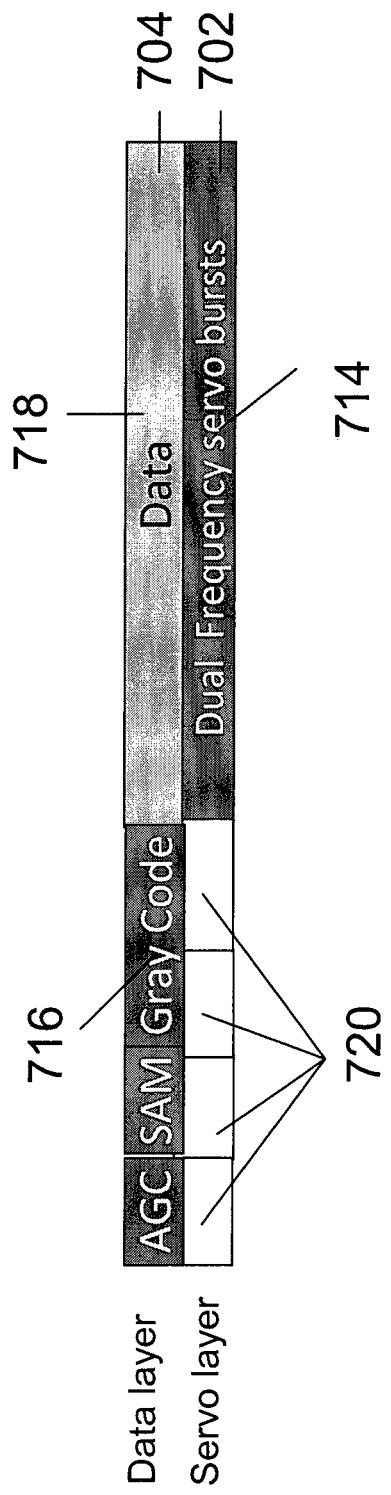
FIG. 7 shows the side view of portion along a servo track in the first layer and a data track along the second layer with data and servo information stored according to various embodiments.

FIG. 7 is a schematic 700 showing the side view of portion along a servo track in the first layer 702 and a data track along the second layer 704 with data and servo information stored according to various embodiments. FIG. 7 shows a recording medium including a first servo pattern 714 (including a servo burst pattern) on a segment of a first track of a first layer 702 of the recording medium according to various embodiments. FIG. 7 further shows a second servo pattern 716 (including addressing information) on a segment of a second track of a second layer 704 of the recording medium according to various embodiments. The second track may be arranged from the first track by half the track width. The addressing information may include auto gain control (AGC), sector address mark (SAM) and GrayCode.

The portion of the second layer (data recording layer) 718 corresponding to the first servo pattern 714 in the first layer may be configured to store data.

The portion of the first layer (servo layer) 720 corresponding to the second servo pattern 716 in the second layer may be configured to be left unused.

In various embodiments, a portion of the second layer corresponding to a segment of the first layer means portions of the data track(s) adjacent to the segment of the first layer or portions of the data track(s) separated from the segment of the first layer by one or more intermediate layers within the recording medium. Conversely, a portion of the first layer corresponding to a segment of the second layer means portions of the servo track(s) adjacent to the segment of the second layer or portions of the servo track(s) separated from the segment of the second layer by one or more intermediate layers within the recording medium. The projection of the segment of the first layer on a plane parallel to the first main surface (or second main surface) of the recording medium may overlap entirely or substantially with the projection of the corresponding portion of the second layer on the plane. Conversely, the projection of the segment of the second layer on a plane parallel to the first main surface (or second main surface) of the recording medium may overlap entirely or substantially with the projection of the corresponding portion of the first layer on the plane. In various embodiments wherein the second layer is on or over the first layer, the corresponding portion of the second layer to a segment on the first layer may directly on or above the segment on the first layer. Additionally, the corresponding portion of the first layer to a segment on the second layer may be directly below the segment on the second layer.

In various embodiments, the method may include using shingled writing scheme. The method may include forming the servo information in a writing pass, followed by rewriting some of the servo information in a subsequent writing pass.

Figures 8A, 8B:
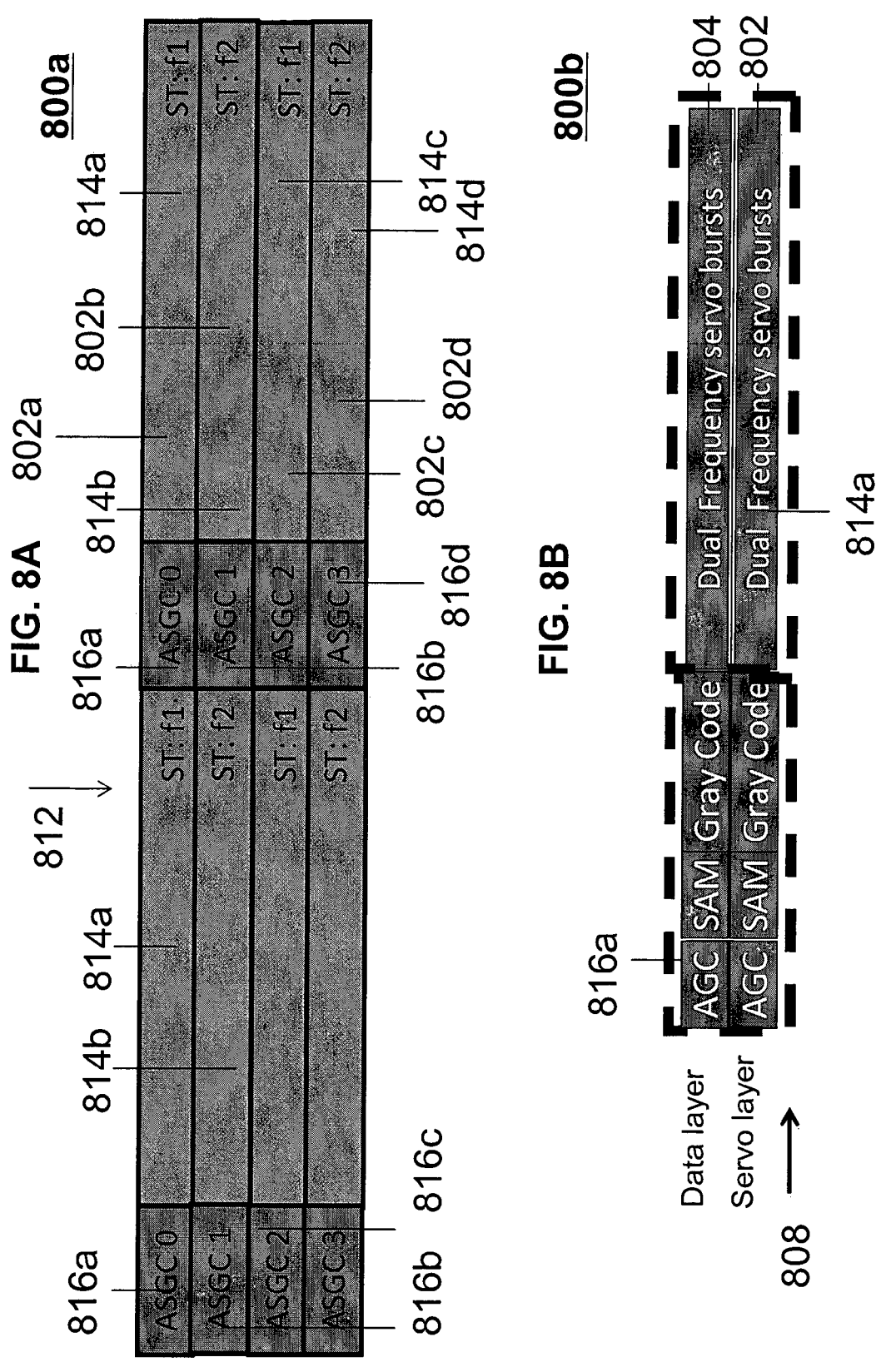
Figure 8C:
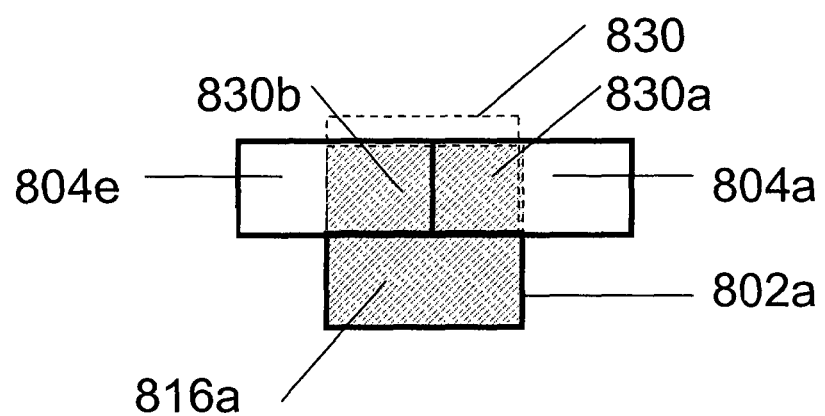

FIG. 8A to G illustrate a method to arrange the servo information shown in FIG. 7 according to various embodiments. FIG. 8A is a schematic 800a showing the top view of servo tracks 802a, 802b, 802c, 802d in a first layer 802 after a writing pass according to various embodiments. FIG. 8B is a schematic 800b showing the side view of a portion along a servo track 802a in the first layer 802 and the overlying second layer 804 after a writing pass according to various embodiments. FIG. 8B may correspond to the view in a direction indicated by arrow 812 in FIG. 8A.

In various embodiments, the method may include forming an intermediate servo pattern 816a (including the addressing information) on a subsequent segment of the first track 802a of the first layer 802 of the recording medium. In other words, the method may include forming the intermediate servo pattern 816a on an adjacent segment on the same layer and on the same track when forming the first servo pattern 814a.

In various embodiments, forming the first servo pattern 814a (including the servo burst pattern) on the segment of the first track 802a of the first layer 802 of the recording medium may be carried out during a writing pass of a magnetic head. Forming the intermediate servo pattern 816a (including the addressing information) on the subsequent segment of the first track 802a of the first layer 802 of the recording medium may be carried out during the same writing pass of the magnetic head. In other words, the intermediate servo pattern 816a may be formed together with the first servo pattern 814a on a writing pass.

In various embodiments, the first servo pattern 814a (including the servo burst pattern) on the segment of the first track 802a of the first layer 802 of the recording medium may also be formed on the portion of the second layer 804 corresponding to the first servo pattern 814a on the segment of the first track 802a of the first layer 802. The first servo pattern 814a on the segment of the first track 802a of the first layer 802 of the recording medium may also be formed on at least a part of a segment of the second track 804a of the second layer 804 of the recording medium. The part of the segment may include about half of the second track 804a directly on or above the segment of the first track 802a of the first layer 802 of the recording medium. The first servo pattern 814a on the segment of the first track 802a of the first layer 802 of the recording medium may also be formed on at least a part of a segment of the track 804e of the second layer 804 of the recording medium. The part of the segment may also include about half the track 804e directly on or above the segment of the first track 802a of the first layer 802 of the recording medium.

FIG. 8C shows a schematic 800c showing the cross section of the first track 802a on the first layer as well as overlying tracks 804a and 804e on the second layer 804. FIG. 8C may corresponds to FIG. 8B when viewed in the direction indicated by arrow 808 in FIG. 8B. In various embodiments, the intermediate servo pattern 816a (including the addressing information) may be formed on the portion 830 of the second layer 804 corresponding to the intermediate servo pattern 816 on the first track 802a of the first layer 802. The intermediate servo pattern 816a formed on the subsequent segment of the first track 802a of the first layer 802 of the recording medium may also be formed on at least a part of a segment 830a of the second track 804a of the second layer 804 of the recording medium. The part of the segment 830a may include about half of the second track 804a directly on or above the segment of the first track 802a of the first layer 802 of the recording medium. The first servo pattern 814a on the segment of the first track 802a of the first layer 802 of the recording medium may also be formed on at least a part of a segment 830b of the track 804e of the second layer 804 of the recording medium. The part of the segment 830b may also include about half the track 804e directly on or above the segment of the first track 802a of the first layer 802 of the recording medium.

The first servo pattern 814a and the intermediate servo pattern 816a on the second layer may not be necessary. The first servo pattern 814a may be replaced during the subsequent writing pass. The intermediate servo pattern 816a may be replaced by the user data in the data recording.

In various embodiments, the magnetic head may write an intermediate servo pattern 816a (including addressing information AGSC0) and the first servo pattern 814a (including servo burst of a first frequency f1) in the first track 802a. The magnetic head may then move one track width to write a subsequent intermediate servo pattern 816b (including addressing information AGSC1) and the third servo pattern 814b (including subsequent servo burst of a second frequency f2) in the third track 802b. The magnetic head may then repeat the previous steps by moving to subsequent servo tracks (such as 802c, 802d etc) to write the subsequent intermediate servo patterns such as 816c, 816d (including addressing information AGSC2, AGSC3 etc.) and servo patterns such as 814c and 814d (including subsequent servo bursts).

Figure 8D:
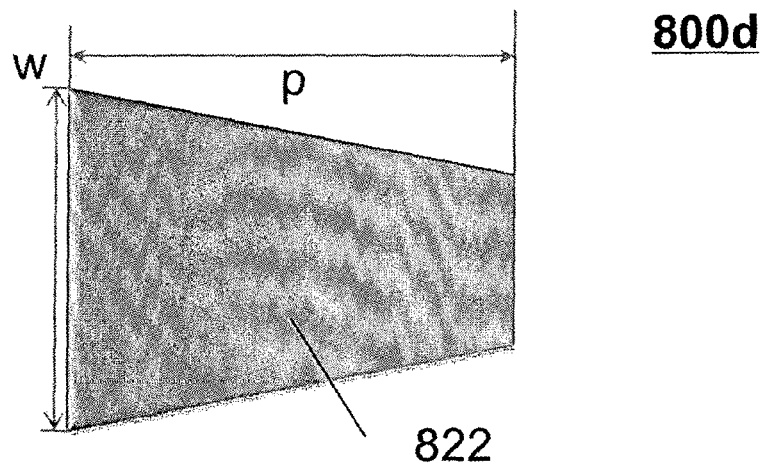
Figure 8E:
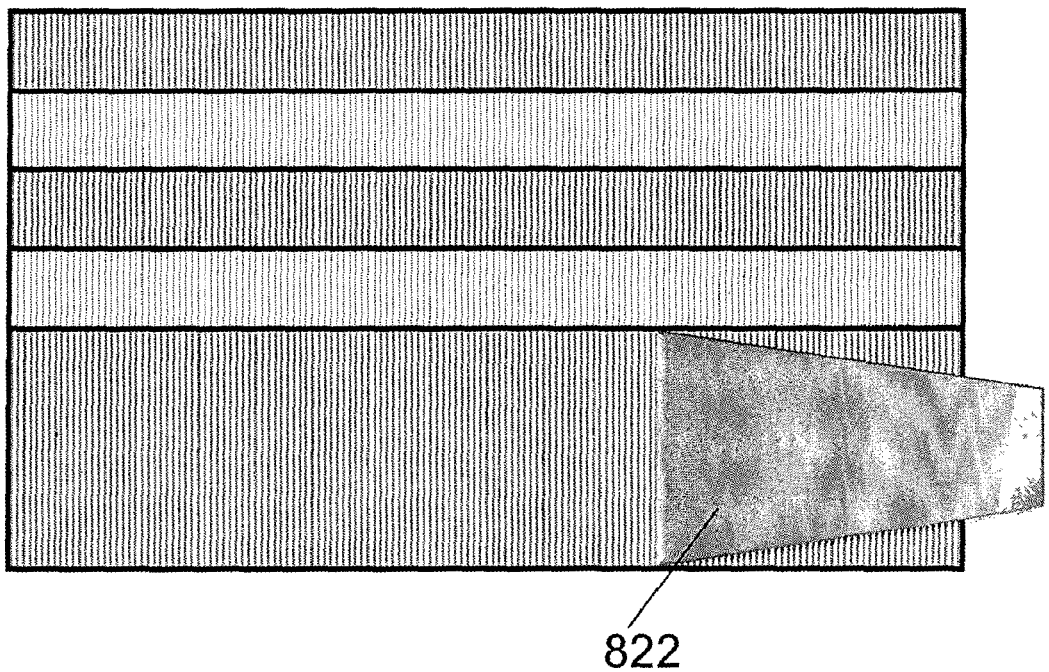

In various embodiments, the magnetic head may be a wide head. FIG. 8D is a schematic 800d showing a wide head 822 according to various embodiments. FIG. 8E is a schematic 800e showing the wide head 822 in operation according to various embodiments. The wide head may have a width w and a length p. The width w may be more than 300 nm. The wide head 822 may be wide enough to provide enough magnetic field to saturate the servo layer 802 for writing servo information.

The wide head 822 may be configured to confine the magnetic field such that prior information that has been written on preceding tracks are not overwritten. The wide head 822 may, for instance, have a shielding component to shield the magnetic field to confine the magnetic field. The wide head 822 may write one track at a time.

For each of the servo track, the addressing information (including the AGC, the SAM and the GrayCode) may be written in one go of a full track writing. The wide head 822 may be used to write the intermediate servo pattern 816a (including addressing information) and the first servo pattern 814a (including servo burst of a first frequency f1) in the first track 802a. The wide head 822 may then move by one track width and writes the subsequent intermediate servo pattern 816b (including addressing information) and the third servo pattern 814b (including subsequent servo burst of a second frequency f2) in the third track. This may be repeated until the wide head 822 has completed writing the servo information over the entire recording medium.

FIG. 8F is a schematic 800f showing the top view of servo tracks 802a, 802b, 802c, 802d in a first layer 802 as well as portions of data tracks 804a, 804b, 804c in a second layer 804 after a subsequent writing pass according to various embodiments. FIG. 8G is a schematic 800g showing the side view of a portion along a servo track 802a in the first layer 802 and the overlying second layer 804 after a subsequent writing pass according to various embodiments. FIG. 8G may correspond to the view in a direction indicated by arrow 824 in FIG. 8G.

In various embodiments, forming the second servo pattern 820a (including addressing information) on a segment of the second track 804a of the second layer 804 of the recording medium may be carried out during a subsequent writing pass of a subsequent magnetic head. The subsequent writing pass may be conducted at drive level during drive self test.

In various embodiments, the intermediate servo pattern 816a formed on the subsequent segment of the first track 802a of the first layer 802 of the recording medium during the first pass may be used as a reference when forming the second servo pattern 820a on the segment of the second track 804a of the second layer 804 during the second pass. Similarly, the subsequent intermediate servo patterns such as 816b, 816c formed on respective subsequent segments of the subsequent first tracks such as 802b, 802c etc. of the first layer 802 of the recording medium during the first pass may be used as a reference when forming the subsequent second servo patterns such as 820b, 820c on respective segments of the subsequent second tracks such as 804b, 804c etc. of the second layer 804 during the second pass. In others words, the addressing information written on the recording medium during the initial writing pass may be used as a reference when writing the addressing information during the subsequent writing pass.

In various embodiments, the subsequent intermediate servo pattern 816b formed on the subsequent segment of the third track 802b of the first layer 802 of the recording medium during the first pass may be used as a reference when forming the second servo pattern 820a on the segment of the second track 804a of the second layer 804 during the second pass. In various embodiments, both the intermediate, servo pattern 816a and the subsequent intermediate servo pattern 816b may be used as a reference when forming the second servo pattern 820a.

The subsequent magnetic head may be a product head.

In various embodiments, the intermediate servo pattern 816a formed on the subsequent segment of the first track 802a of the first layer 802 of the recording medium during the first pass may be distorted when forming the second servo pattern 820a on the segment of the second track 804a of the second layer 804 during the second pass. Similarly, the subsequent intermediate servo patterns such as 816b, 816c formed on the respective subsequent segments of the subsequent first tracks such as 802b, 802c, 802d etc. of the first layer 802 of the recording medium during the first pass may be distorted when forming the second servo pattern such as 820b, 820c on the respective segments of the subsequent second tracks 804b, 804c etc of the second layer 804 during the second pass.

In other words, the addressing information written during the initial writing pass may be distorted. There may be residual patterns or no patterns in the subsequent segment of tracks such as 802a, 802b, 802c, 802d etc. of the first layer 802 of the recording medium after the second writing pass. The subsequent segment may be configured to be unused over the lifetime of the recording medium.

In various embodiments, the subsequent intermediate servo pattern 816b formed on the subsequent segment of the third track 802b of the first layer 802 of the recording medium during the first pass may be distorted when forming the second servo pattern 820a on the segment of the second track 804a of the second layer 804 during the second pass.

In various embodiments, the first servo pattern 814a, 814b etc. (including the servo bursts) on the segment of the first track 802a, 802b etc. of the first layer 814 of the recording medium may remain over the lifetime of the recording medium.

In various embodiments, additional servo patterns may be formed during the writing pass or subsequent writing pass on the corresponding segments of the second track 804a, 804b, 804c etc of the second layer 804 to first servo patterns 814a, 814b etc. The corresponding segments may be overwritten with data 818 during self test phase or the actual user data recording.

Various embodiments provide a recording medium wherein the number of steps required may be double or more than double the number of servo tracks. Various embodiments may provide a method in which half of the number of steps for writing servo information is transferred to the drive level during the subsequent writing pass. Various embodiments may provide a method with low manufacturing costs as writing during the initial writing pass (at disk media level) may be more expensive than the subsequent writing pass (at drive level).

Figure 9A:
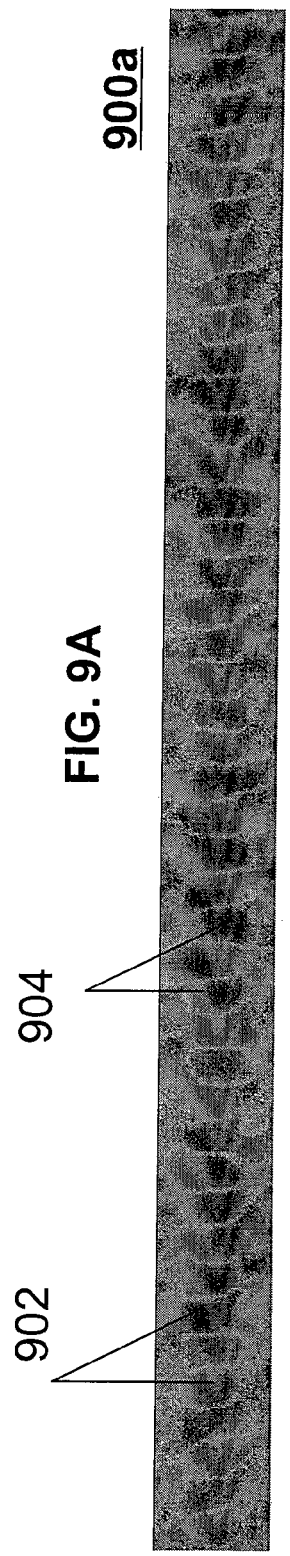
FIG. 9A shows a signal map of a conventional single layer recording medium.
Figure 9B:
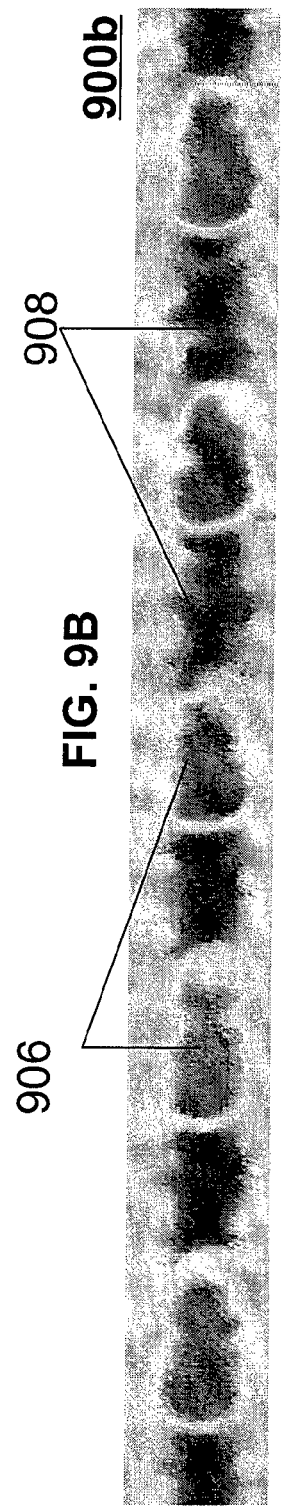
FIG. 9B shows another signal map of a conventional single layer recording medium.
Figure 9C:
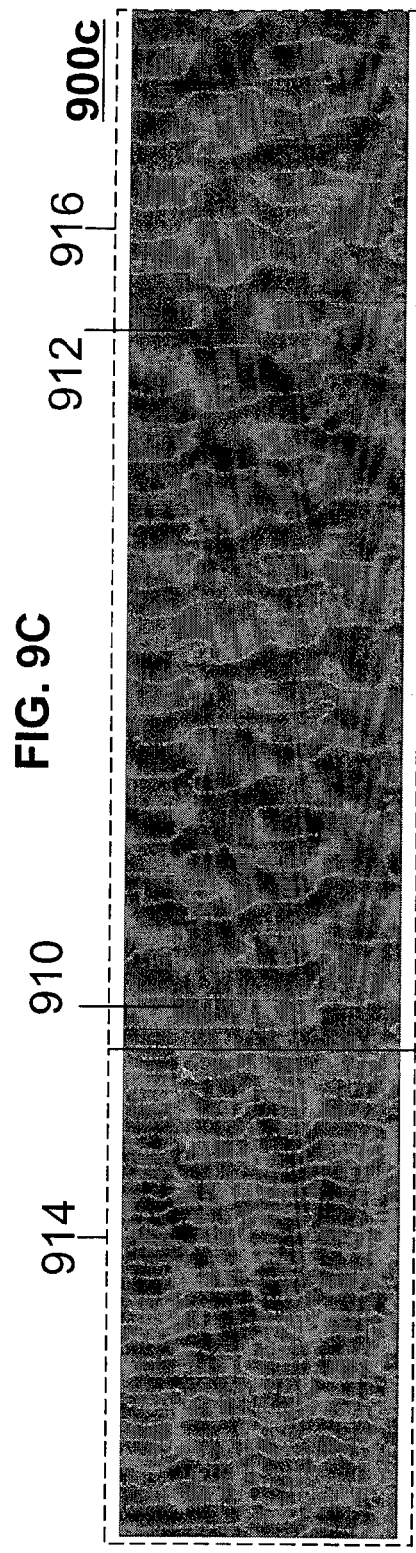
FIG. 9C shows a signal map of a multi-layer recording medium according to various embodiments.
Figure 9D:
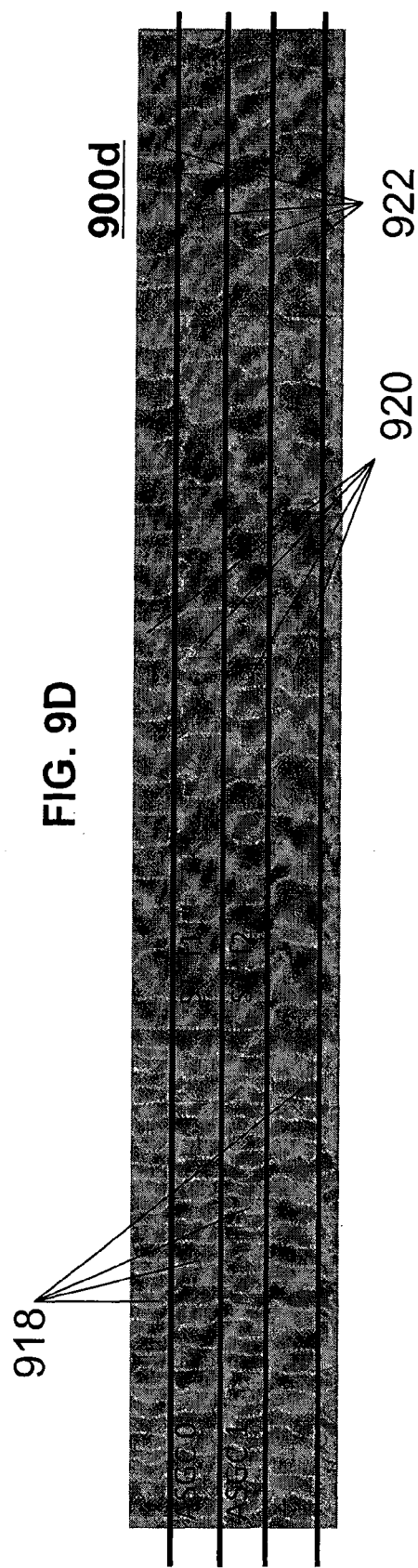
FIG. 9D shows the signal map of the multi-layer recording medium after a writing pass is carried out according to various embodiments.
Figure 9E:
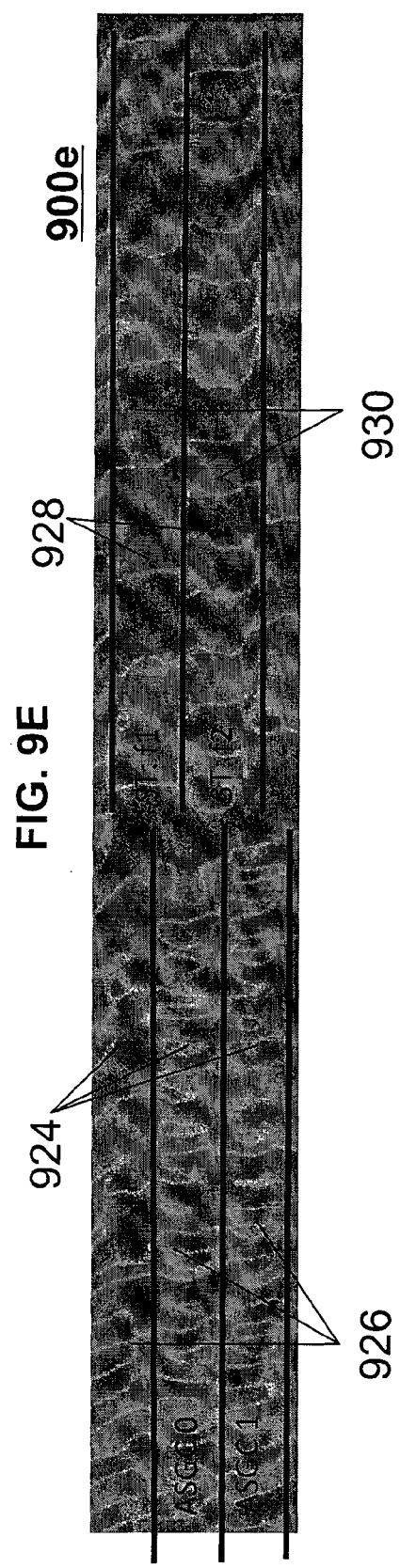
FIG. 9E shows the signal map of the multi-layer recording medium after a subsequent writing pass is carried out according to various embodiments.

FIG. 9A is an image 900a showing the signal map of a conventional single layer recording medium. Red spots 902 may represent one logic state while blue spots 904 may represent another logic state. FIG. 9B is another image 900b showing the signal map of a conventional single layer recording medium. Red spots 906 may represent one logic state while blue spots 908 may represent another logic state. FIG. 9C is an image 900c showing the signal map of a multi layer recording medium according to various embodiments. Red spots 910 may represent one logic state while blue spots 912 may represent another logic state. The region 914 may be a portion in which the addressing information is stored while the region 916 may be a portion in which the servo bursts is stored. FIGS. 9D and 9E show the signals maps obtained from a multi layer recording medium in which servo information is written according to a method illustrated in FIGS. 8A to F according to various embodiments. FIG. 9D is an image 900d showing the signal map of the multi-layer recording medium after a writing pass is carried out according to various embodiments. Image 900d shows that the addressing information 918 are aligned to the servo bursts 920 in the servo tracks 922. FIG. 9E is an image 900e showing the signal map of the multi-layer recording medium after a subsequent writing pass is carried out according to various embodiments. Image 900e shows that the addressing information 924 in the data tracks 926 are aligned by half a track width from the servo bursts 928 in the servo tracks 930.

Figure 10:
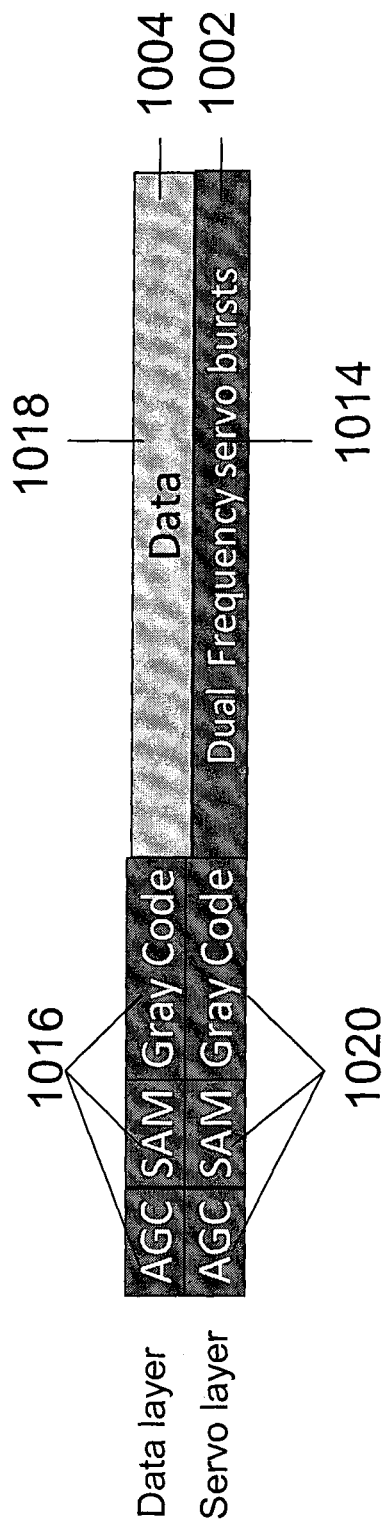
FIG. 10 shows the side view of portion along a servo track in the first layer and a data track along the second layer with data and servo information stored according to various embodiments.

FIG. 10 is a schematic 1000 showing the side view of portion along a servo track in the first layer 1002 and a data track along the second layer 1004 with data and servo information stored according to various embodiments. FIG. 10 shows a recording medium including a first servo pattern 1014 (including a servo burst pattern) on a segment of a first track of a first layer of the recording medium according to various embodiments. FIG. 10 further shows a second servo pattern 1016 including addressing information on a segment of a second track of a second layer 1004 of the recording medium according to various embodiments. The data recording medium may further include a second servo pattern 1020 (including addressing information) on a portion of the first layer 1002, the portion corresponding to the segment (for storing second servo pattern 1016) of the second track of the second layer 1004. In other words, a portion of the first layer 1002 corresponding to servo pattern 1016 may be configured to store a second servo pattern 1020 (including addressing information). The addressing information may include auto gain control (AGC), sector address mark (SAM) and Gray-Code.

The portion of the second layer (data recording layer) 1018 corresponding to the first servo pattern 1014 in the first layer may be configured to store data.

In various embodiments, the second layer 1004 may be over the first layer 1002. The second servo pattern 1020 (including addressing information) may be on a portion of the first layer 1002, the portion of the first layer 1002 below the segment of the second track of the second layer 1004 (for storing the second servo pattern 1016). In various embodiments, the second servo pattern 1020 may be on a portion of the first layer 1002, the portion of the first layer 1002 corresponding to the segment of the second track of the second layer 1004.

In various embodiments, a portion of the second layer corresponding to a segment of the first layer means portions of the data track(s) adjacent to the segment of the first layer or portions of the data track(s) separated from the segment of the first layer by one or more intermediate layers within the recording medium. Conversely, a portion of the first layer corresponding to a segment of the second layer means portions of the servo track(s) adjacent to the segment of the second layer or portions of the servo track(s) separated from the segment of the second layer by one or more intermediate layers within the recording medium. The projection of the segment of the first layer on a plane parallel to the first main surface (or second main surface) of the recording medium may overlap entirely or substantially with the projection of the corresponding portion of the second layer on the plane. Conversely, the projection of the segment of the second layer on a plane parallel to the first main surface (or second main surface) of the recording medium may overlap entirely or substantially with the projection of the corresponding portion of the first layer on the plane. In various embodiments wherein the second layer is on or over the first layer, the corresponding portion of the second layer to a segment on the first layer may directly on or above the segment on the first layer. Additionally, the corresponding portion of the first layer to a segment on the second layer may be directly below the segment on the second layer.

FIGS. 11A to H illustrate a method to arrange the servo information shown in FIG. 10 according to various embodiments. FIG. 11A is a schematic 1100a showing a top view of portions of a plurality of tracks configured to store servo information after a first step. FIG. 11B is a schematic 1100b showing a side view of FIG. 11A when viewed from the direction indicated by 1112a in FIG. 11A. FIG. 11A shows that the first step includes writing a first servo pattern 1114a including servo bursts to a segment along a first track 1102a in the first layer 1102. The servo bursts may be of a first frequency. The first servo pattern 1114a may also be written to a portion of the second layer 1104 corresponding to the first servo pattern 1114a in the first layer 1102. The portion of the second layer 1104 corresponding to the first servo pattern 1114a in the first layer 1102 may be configured to store data. As such, the first servo pattern 1114a on the portion of second layer 1104 (corresponding to the first servo pattern 1114a in the first layer 1102) may be overwritten with data.

FIG. 11C is a schematic 1100c showing a top view of portions of a plurality of tracks configured to store servo information after a second step. FIG. 11D is a schematic 1100d showing a side view of FIG. 11C when viewed from the direction indicated by 1112b in FIG. 11C. FIG. 11C shows that the second step includes writing a second servo pattern 1116a (including addressing information) to a segment along a second track 1104a in the second layer 1104. The magnetic head may move half a track width after completion of the first step to carry out writing of the second track 1104a in the second step. The method may include writing the second servo pattern 1116a on the segment of the second track 1104a in the second layer 1104. In various embodiments, the method may further include writing the second servo pattern 1120a (including addressing information) on a portion of the first layer 1102, the portion of the first layer 1102 below the segment of the second track 1104a of the second layer 1104 (for writing the second servo pattern 1116a). The second servo pattern 1120a on the portion of the first layer 1102 may be written together with the second servo pattern 1116*a* on a segment of the second track 1104*a* in the second layer 1104. The portion of the first layer 1102 may include about half of the first track 1102*a*. The about half of the first track 1102*b* may be directly below the second servo pattern 1116*a*. The portion of the first layer 1102 may include about half of the third track 1102*b*. The about half of the first track 1102*b* may be directly below the second servo pattern 1116*a*.

FIG. 11E is a schematic 1100*e* showing a top view of portions of a plurality of tracks configured to store servo information after a third step. FIG. 11F is a schematic 1100*f* showing a side view of FIG. 11E when viewed from the direction indicated by 1112*c* in FIG. 11E. FIG. 11E shows that the third step includes writing a third servo pattern 1114*b* (including a subsequent servo burst) to a segment along a third track 1102*b* in the first layer 1102. The magnetic head may move half a track width after completion of the second step to carry out writing of the third track 1102*b* in the third step. The subsequent servo burst may be of a second frequency. The third servo pattern 1114*b* may also be written to a portion of the second layer 1104 corresponding to the third servo pattern 1114*b* in the first layer 1102. The portion of the second layer 1104 corresponding to the third servo pattern 1114*b* in the first layer 1102 may be configured to store data. As such, the third servo pattern 1114*b* on the portion of second layer 1104 (corresponding to the third servo pattern 1114*b* in the first layer 1102) may be overwritten with data.

FIG. 11G is a schematic 1100*g* showing a top view of portions of a plurality of tracks configured to store servo information after a fourth step. FIG. 11H is a schematic 1100*h* showing a side view of FIG. 11G when viewed from the direction indicated by 1112*d* in FIG. 11G. FIG. 11G shows that the fourth step includes writing a fourth servo pattern 1116*b* (including addressing information) to a segment along a fourth track 1104*b* in the second layer 1104. The magnetic head may move half a track width after completion of the third step to carry out writing of the fourth track 1104*b* in the fourth step. The method may include writing the fourth servo pattern 1120*b* (including addressing information) on a portion of the first layer 1102 corresponding the fourth servo pattern 1116*b* on the segment of the second track 1104*a* in the second layer 1104. In various embodiments, the method may further include writing the fourth servo pattern 1120*b* (including addressing information) on a portion of the first layer 1102, the portion of the first layer 1102 below the segment of the fourth track 1104*b* of the second layer 1104 (for writing the second servo pattern 1116*b*). The fourth servo pattern 1120*b* on the portion of the first layer 1102 may be written together with the fourth servo pattern 1116*b* on a segment of the second track 1104*a* in the second layer 1104.

The method may include subsequent steps to write the subsequent servo pattern including servo bursts to the servo tracks or to write the subsequent servo pattern including addressing information to the data tracks. The steps may be repeated until the entire surface of the recording medium is written.

The first step and the second step may be carried out in a single pass. The first step, the second step, the third step, the fourth steps and the subsequent steps may be carried out in a single pass.

The magnetic head may be a wide head.

The first servo pattern (including the servo burst pattern) on the segment of the first track of the first layer, the second servo pattern including addressing information on the segment of the first track of the first layer and the second servo pattern (including addressing information) on the segment of the second track of the second layer may be formed in a single pass.

Various embodiments may include doubling the total track numbers as the magnetic head is moved half a track width for each step.

In various embodiments, the second layer (data recording layer) may include disk repeatable run out (RRO) compensation information.

In various other embodiments, the first step may include writing a first servo pattern 1114*a* including a servo burst pattern to a segment along a first track 1102*a* in the first layer 1102. The second step may include moving the magnetic head by one track width. The second step may include writing a third servo pattern 1114*b* including a subsequent servo burst pattern to a segment along a third track 1102*b*. The subsequent steps may include moving the magnetic head by one track width. The subsequent steps may include writing subsequent servo patterns including subsequent servo burst patterns until all the servo burst patterns have been written. The servo patterns including servo bursts may be written by a wide head. In other words, the magnetic head may be a wide head. The method may further include writing servo information 1116*a* including addressing information to a segment along the second track 1104*a* in the second layer 1102. Writing the servo pattern 1116*a* including the addressing information may be carried out using a subsequent magnetic head. The method may further include moving the subsequent magnetic head by one track width. The method may further include writing a fourth servo burst pattern 1116*b* including addressing information to a segment along the fourth track 1104*b* in the second layer 1104 (using the subsequent magnetic head). The method may also include writing subsequent servo patterns including addressing information by moving the subsequent magnetic head by one track width at a time and writing the addressing information until all the addressing information has been written. The subsequent magnetic head may be a product head.

Figure 12:
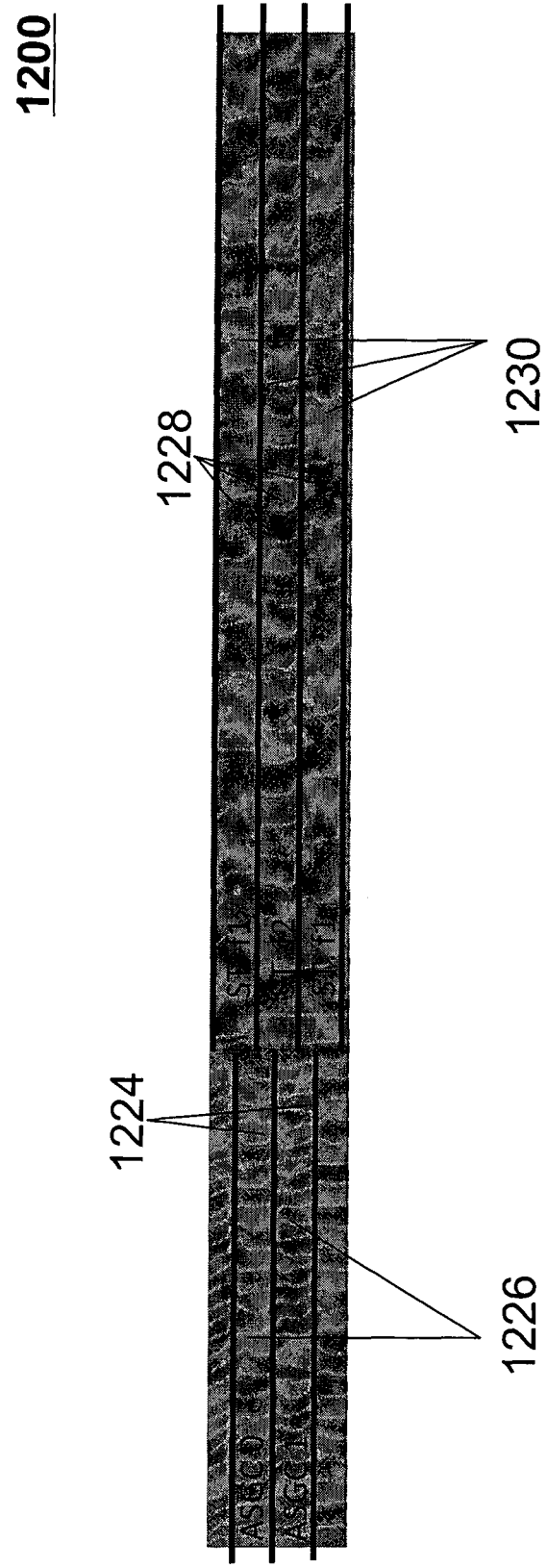
FIG. 12 shows the signal map of a multi-layer recording medium after a writing pass is carried out according to various embodiments.

FIG. 12 is an image 1200 showing the signal map of a multi-layer recording medium after a writing pass is carried out according to various embodiments. Image 1200 shows that the addressing information 1224 in the data tracks 1226 are aligned by half a track width from the servo bursts 1228 in the servo tracks 1230.

In various embodiments, a method of writing servo information may be provided. The method may include forming a first servo pattern (including a servo burst pattern) on a segment of a first track of a first layer of the recording medium, the first track having a track width. The method may further include forming a second servo pattern (including addressing information) on a segment of a second track of a second layer of the recording medium. The second track may be arranged from the first track by half the track width.

The method may further include forming a third servo pattern (including a subsequent servo burst pattern) on a segment of a third track of the first layer of the recording medium. The third track may be arranged from the second track by half a track width. The second track may be between the first track and the third track.

In various embodiments, the servo burst pattern may be of a first frequency and the subsequent servo burst pattern may be of a second frequency. Alternatively, the servo burst pattern and the subsequent servo burst pattern may be of a single frequency. The servo burst pattern and the subsequent servo burst pattern may be of direct current (DC).

The addressing information may include auto gain control (AGC), sector address mark (SAM) and GrayCode.

In various embodiments, the second layer may be over the first layer.

The method may further include forming an intermediate servo pattern (including the addressing information) on a subsequent segment of the first track of the first layer of the recording medium.

In various embodiments, forming the first servo pattern (including the servo burst pattern) on the segment of the first track of the first layer of the recording medium may be carried out during a writing pass of a magnetic head. In various embodiments, forming the intermediate servo pattern (including the addressing information) on the subsequent segment of the first track of the first layer of the recording medium may be carried out during the same writing pass of the magnetic head. In other words, the first servo information on the segment of the first track of the first layer and the intermediate servo information on the subsequent segment of the first track of the first layer may be formed during a single writing pass of the magnetic head.

In various embodiments, the magnetic head may be a wide head.

In various embodiments, forming the second servo pattern (including addressing information) on the segment of the second track of the second layer of the recording medium may be carried out during a subsequent writing pass of a subsequent magnetic head.

In various embodiments, the subsequent magnetic head may be a product head.

In various embodiments, the intermediate servo pattern formed on the subsequent segment of the first track of the first layer of the recording medium during the writing pass may be used as a reference when forming the second servo pattern on the segment of the second track of the second layer during the subsequent writing pass.

The intermediate servo pattern formed on the subsequent segment of the first track of the first layer of the recording medium during the writing pass may be distorted when forming the second servo pattern on the segment of the second track of the second layer during the subsequent writing pass.

In various embodiments, forming the second servo pattern (including addressing information) may further include forming the second servo pattern (including addressing information) on a portion of the first layer, the portion of the first layer corresponding to the segment of the second track of the second layer.

In various embodiments, the second layer may be over the first layer. Forming the second servo pattern (including addressing information) may further include forming the second servo pattern (including addressing information) on a portion the first layer, the portion of the first layer below the segment of the second track of the second layer. In other words, the second servo pattern (including addressing information) may be further formed on a portion of the first layer, the portion corresponding to (e.g. below) the segment of the second track of the second layer, in addition to forming the second servo pattern on the segment of the second track of the second layer.

In various embodiments, the first servo pattern (including the servo burst pattern on the segment of the first track of the first layer, the second servo pattern (including addressing information) on the segment of the first track of the first layer and the second servo pattern (including addressing information) on the segment of the second track of the second layer may be formed in a single writing pass.

The single writing pass may be carried out using a wide head.

In various embodiments, a recording medium may be provided. The recording medium may include a first servo pattern (including a servo burst pattern) on a segment of a first track of a first layer of the recording medium.

The recording medium may also include second servo pattern may include addressing information on a segment of a second track of a second layer of the recording medium. The second track may be arranged from the first track by half the track width.

In various embodiments, the recording medium may further include a third servo pattern (including a subsequent servo burst pattern) on a segment of a third track of the first layer of the recording medium. The third track may be arranged from the second track by half a track width. The second track may be between the first track and the third track.

In various embodiments, the servo burst pattern may be of a first frequency and the subsequent servo burst pattern may be of a second frequency. Alternatively, the servo burst pattern and the subsequent servo burst pattern may be of a single frequency. The servo burst pattern and the subsequent servo burst pattern may be of direct current (DC).

The addressing information may include auto gain control (AGC), sector address mark (SAM) and GrayCode.

In various embodiments, the second layer may be over the first layer.

In various embodiments, the recording medium may further include an intermediate servo pattern (including the addressing information) on a subsequent segment of the first track of the first layer of the recording medium.

The first servo pattern (including the servo burst pattern) on the segment of the first track of the first layer of the recording medium may be formed during a writing pass of the magnetic head. The intermediate servo pattern (including the addressing information) on the subsequent segment of the first track of the first layer of the recording medium may be formed during the same writing pass of the magnetic head. In other words, the first servo information on the segment of the first track of the first layer and the intermediate servo information on the subsequent segment of the first track of the first layer may be formed during a single writing pass of the magnetic head.

The magnetic head may be a wide head.

In various embodiments, the second servo pattern (including addressing information) on the segment of the second track of the second layer of the recording medium may be formed during a subsequent writing pass of a subsequent magnetic head. The subsequent magnetic head may be a product head.

In various embodiments, the intermediate servo pattern on the subsequent segment of the first track of the first layer of the recording medium formed during the writing pass may be used as a reference for the second servo pattern on the segment of the second track of the second layer formed during the subsequent writing pass.

In various embodiments, the intermediate servo pattern on the subsequent segment of the first track of the first layer of the recording medium formed during the writing pass may be distorted by the second servo pattern on the second track of the second layer formed during the subsequent writing pass.

In various embodiments, the second servo pattern (including addressing information) may be further include formed on a portion of the first layer, the portion of the first layer corresponding to the segment of the second track of the second layer.

In various embodiments, the second layer may be over the first layer. The second servo pattern (including addressing information) may be further formed on a portion of the first layer, the portion of the first layer below the segment of the second track of the second layer. In other words, the second servo pattern (including addressing information) may be further formed on a portion of the first layer, the portion corresponding to (e.g. below) the segment of the second track of the second layer, in addition to forming the second servo pattern on the segment of the second track of the second layer.

In various embodiments, the first servo pattern (including the servo burst pattern) on the segment of the first track of the first layer, the second servo pattern (including addressing information) on the segment of the first track of the first layer and the second servo pattern (including the addressing information) on the segment of the second track of the second layer may be formed in a single writing pass.

The single writing pass may be carried out using a wide head.

The data storage device may include a memory which is for example used in the processing carried out by the data storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

While several exemplary embodiments have been presented in the foregoing detailed description of the invention, it should be appreciated that a vast number of variations exist, including variations as to the choice of bearings. It will be understood by one skilled in the art that where fluid dynamic bearings are not used, the bias ring may be an optional feature. Also, the step of pre-assembly should be understood to be optional as the bias ring may be embedded or otherwise provided as an integral part of the stator, etc.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of writing servo information on a recording medium, the method comprising:
    forming a first servo pattern comprising a servo burst pattern on a segment of a first track of a first layer of the recording medium, the first track having a track width; and
    forming a second servo pattern comprising addressing information on a segment of a second track of a second layer of the recording medium,
    wherein the second track is arranged from the first track by half the track width.

2. The method according to claim 1, further comprising:
    forming a third servo pattern comprising a subsequent servo burst pattern on a segment of a third track of the first layer of the recording medium,
    wherein the third track is arranged from the second track by half a track width of the second track.

3. The method according to claim 2,
    wherein the second track is between the first track and the third track.

4. The method according to claim 2,
    wherein the servo burst pattern is of a first frequency and the subsequent servo burst pattern is of a second frequency.

5. The method according to claim 2,
    wherein the servo burst pattern and the subsequent servo burst pattern may be of a single frequency.

6. The method according to claim 1,
    wherein the addressing information comprises auto gain control (AGC), sector address mark (SAM) and Gray-Code.

7. The method according to claim 1,
    wherein the second layer is over the first layer.

8. The method according to claim 1, further comprising:
    forming an intermediate servo pattern comprising the addressing information on a subsequent segment of the first track of the first layer of the recording medium.

9. The method according to claim 8,
    wherein forming the first servo pattern comprising the servo burst pattern on the segment of the first track of the first layer of the recording medium is carried out during a writing pass of a magnetic head; and
    forming the intermediate servo pattern comprising the addressing information on the subsequent segment of the first track of the first layer of the recording medium is carried out during the same writing pass of the magnetic head.

10. The method according to claim 9,
    wherein the magnetic head is a wide head.

11. The method according to claim 9,
    wherein forming the second servo pattern comprising addressing information on the segment of the second track of the second layer of the recording medium is carried out during a subsequent writing pass of a subsequent magnetic head.

12. The method according to claim 11,
    wherein the subsequent magnetic head is a product head.

13. The method according to claim 11,
    wherein the intermediate servo pattern formed on the subsequent segment of the first track of the first layer of the recording medium during the writing pass is used as a reference when forming the second servo pattern on the segment of the second track of the second layer during the subsequent writing pass.

14. The method according to claim 11,
    wherein the intermediate servo pattern formed on the subsequent segment of the first track of the first layer of the recording medium during the writing pass is distorted when forming the second servo pattern on the segment of the second track of the second layer during the subsequent writing pass.

15. The method according to claim 1,
    wherein the second layer is over the first layer; and
    wherein forming the second servo pattern comprising addressing information further comprises
        forming the second servo pattern comprising addressing information on a portion the first layer, the portion of the first layer below the segment of the second track of the second layer.

16. The method according to claim 15,
    wherein the first servo pattern comprising the servo burst pattern on the segment of the first track of the first layer, the second servo pattern comprising addressing information on the segment of the first track of the first layer and the second servo pattern comprising addressing information on the segment of the second track of the second layer is formed in a single writing pass.

17. The method according to claim 16,
wherein the single writing pass is carried out using a wide head.

18. A recording medium, comprising:
a first servo pattern comprising a servo burst pattern on a segment of a first track of a first layer of the recording medium; and
a second servo pattern comprising addressing information on a segment of a second track of a second layer of the recording medium,
wherein the second track is arranged from the first track by half a track width of the first track.

19. The recording medium according to claim 18, further comprising:
a third servo pattern comprising a subsequent servo burst pattern on a segment of a third track of the first layer of the recording medium,
wherein the third track is arranged from the second track by half a track width of the second track.

20. The recording medium according to claim 19,
wherein the second track is between the first track and the third track.

\* \* \* \* \*